No. 3,572. REISSUED JULY 27, 1869.

T. ALDEN.

TYPE SETTING MACHINE.

6 SHEETS—SHEET 1.

THE NORRIS PETERS CO., WASHINGTON, D. C.

No. 3,572. REISSUED JULY 27, 1869.
T. ALDEN.
TYPE SETTING MACHINE.
6 SHEETS—SHEET 2.
Fig. 4.
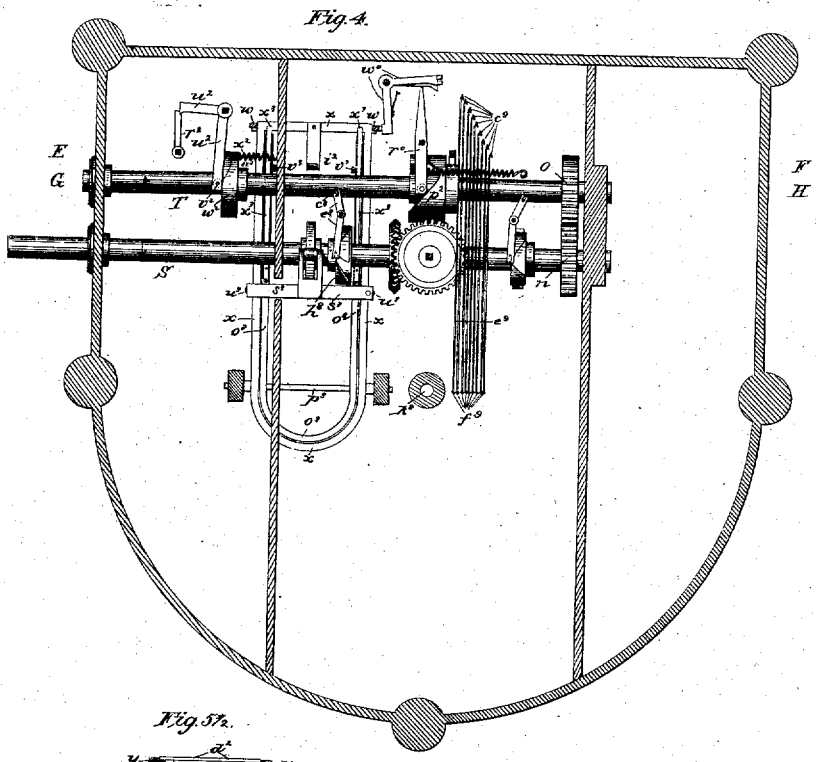
Fig. 5½.
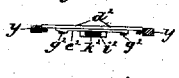
Fig. 5.
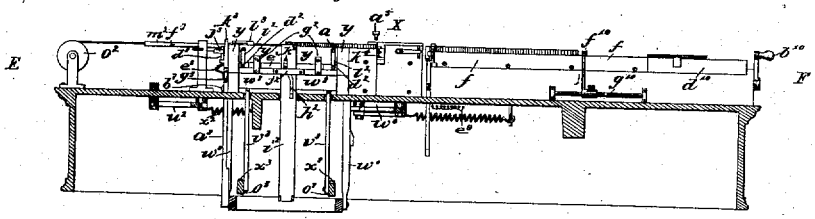
Fig. 6.
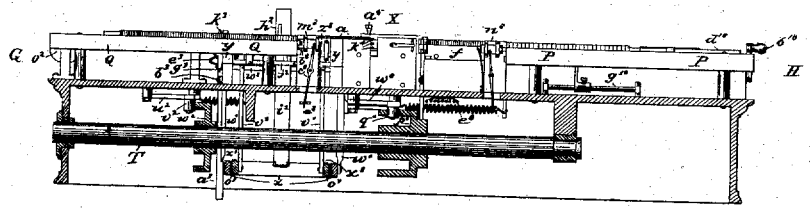
THE NORRIS PETERS CO., WASHINGTON, D. C.

No. 3,572. REISSUED JULY 27, 1869.
T. ALDEN.
TYPE SETTING MACHINE.
6 SHEETS—SHEET 3.
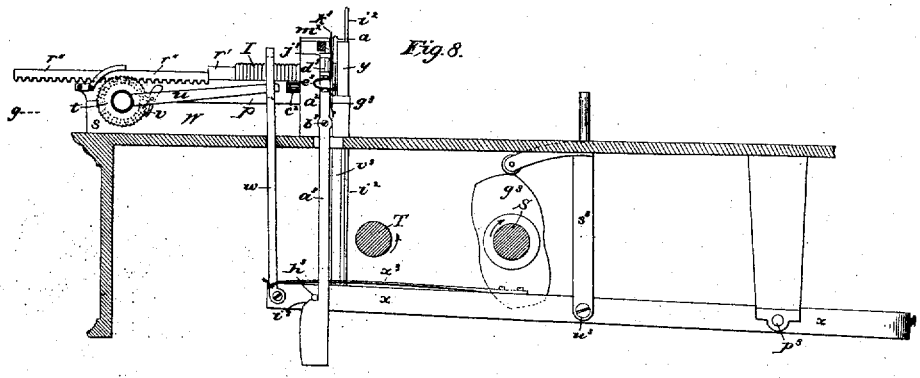
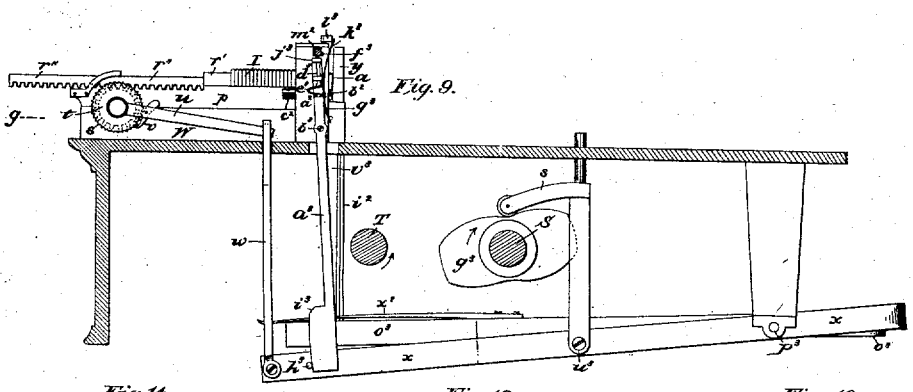
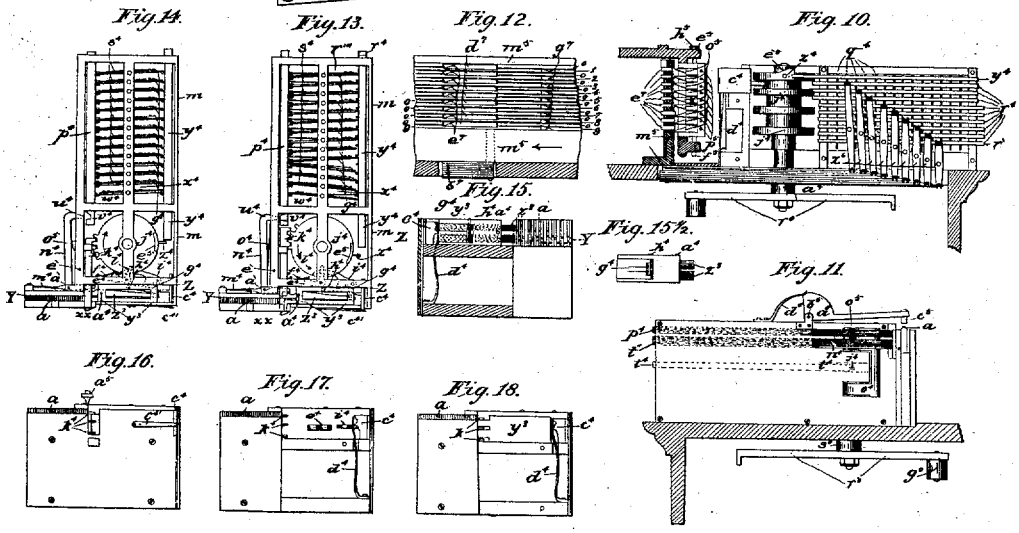
THE NORRIS PETERS CO., WASHINGTON, D. C.

No. 3,572.

REISSUED JULY 27, 1869.

T. ALDEN.

TYPE SETTING MACHINE.

6 SHEETS—SHEET 4.

THE NORRIS PETERS CO., WASHINGTON, D. C.

No. 3,572. REISSUED JULY 27, 1869.

T. ALDEN.

TYPE SETTING MACHINE.

8 SHEETS—SHEET 5.

THE NORRIS PETERS CO., WASHINGTON, D. C.

No. 3,572.
REISSUED JULY 27, 1869.
T. ALDEN.
TYPE SETTING MACHINE.
6 SHEETS—SHEET 6.
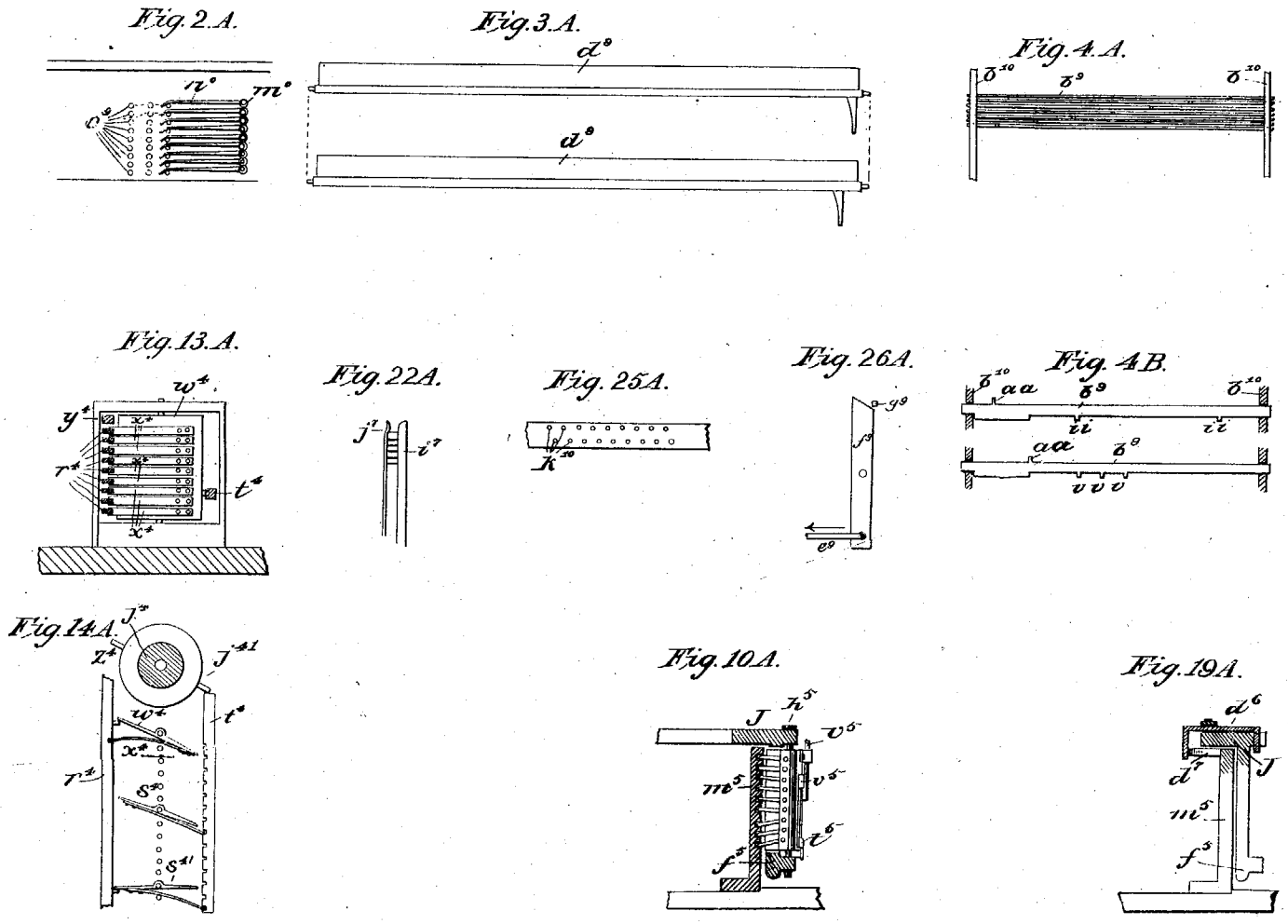
THE NORRIS PETERS CO., WASHINGTON, D. C.

UNITED STATES PATENT OFFICE.

THE ALDEN TYPE SETTING AND DISTRIBUTING MACHINE COMPANY, OF NEW YORK, N. Y., ASSIGNEES, BY MESNE ASSIGNMENTS, OF TIMOTHY ALDEN.

IMPROVEMENT IN TYPE SETTING AND DISTRIBUTING MACHINES.

Specification forming part of Letters Patent No. 18,175, dated September 15, 1857; Reissue No. 3,572, dated July 27, 1869.

*To all whom it may concern:*

Be it known that TIMOTHY ALDEN, of New York, county of New York, and State of New York, during his life-time did invent certain new and useful Improvements in Machinery for Setting and Distributing Types; and I, C. T. LIVERMORE, President of the ALDEN TYPE SETTING AND DISTRIBUTING MACHINE COMPANY, do hereby declare that the following is a full, clear, and exact description of said invention, reference being had to the annexed drawings, making a part of this specification, which are fully described and referred to by letter herein—that is to say:

The improvements in machines for setting and distributing type above referred to consist in a machine partly automatical in its operation, and partly operating by the action of an attendant. The purely automatical part lies in the type-distributing operation, while the setting of type is governed by the attendant. Both setting and distributing may be going on at the same time or separately. A machine of which the functions are so varied must of necessity be composed of many parts having more or less complexity, both in construction and operation. In order to give clear comprehension of those parts while being described in detail, in the first instance, a general description of the invention will be given.

Figure 3:
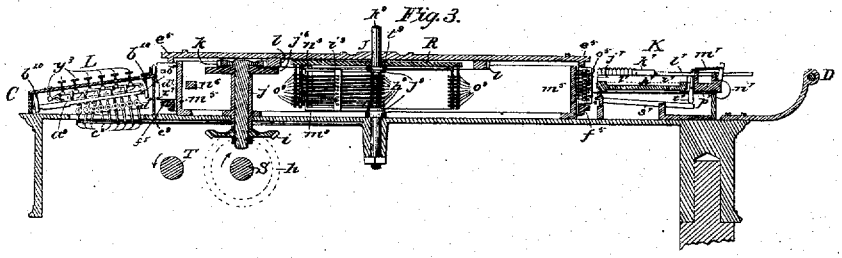
Figure 2:
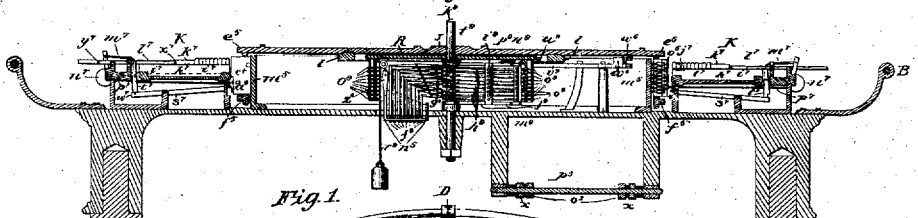
Figure 1:
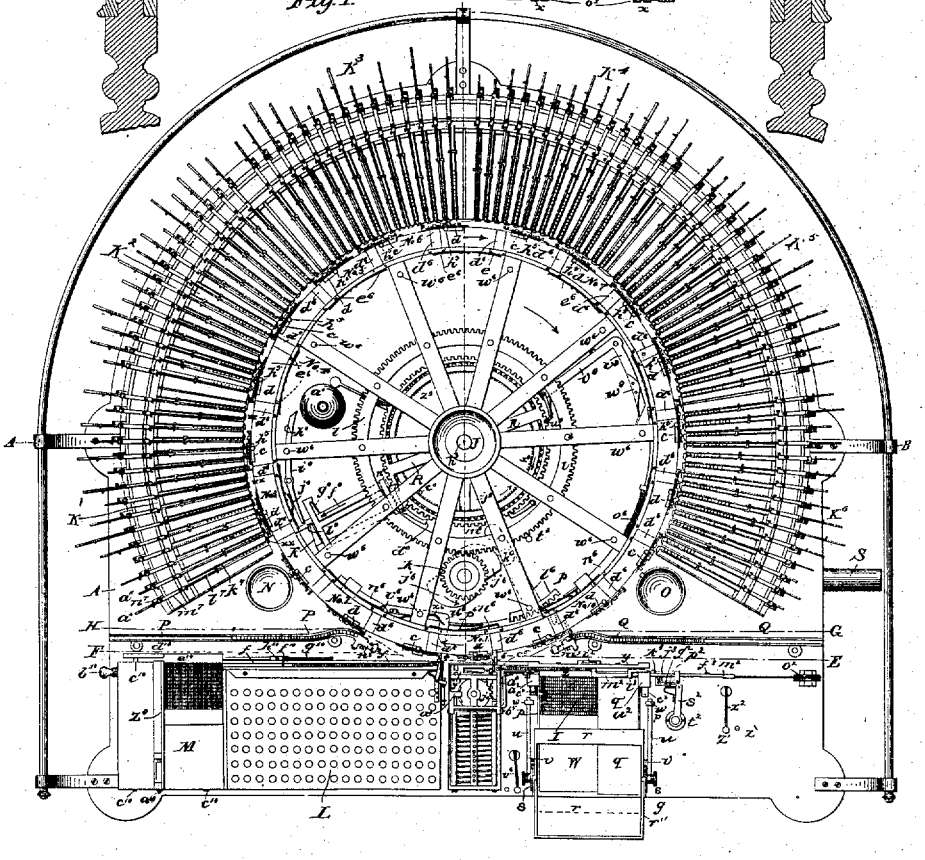

In the accompanying drawings, Figure 1 is a top view or plan of this machine. Fig. 2 is a transverse vertical section thereof on the line A B of Fig. 1, looking toward the back. Fig. 3 is a vertical section on the line D C of Fig. 1. Fig. 4 is a top or plan view of the parts below the bed or floor of the machine, that floor being removed. Fig. 5 is a vertical section on the line E F of Fig. 1. Fig. 6 is a like section on the line G H of Fig. 1, both of these being, as seen, toward the front.

The other figures are all of parts in detail, and are fully referred to in their appropriate places.

Similar letters indicate like parts in all the figures.

This machine may be properly set forth under three general heads or divisions, viz: First, the mechanism for conveying the type to and from the type-cases and composing and distributing tables, including the arrangement of the type-cases; second, the mechanism for distributing the type, in connection with the aforesaid means; and, third, the mechanism for setting the type, in connection with said first-named means.

The type is carried from one place to another upon the edge of a wheel, kept in constant rotation by some suitable power independent of the attendant upon the machine. This wheel is supported in a horizontal position above a suitable bed-plate or table, a plan view of which is semicircular, or rather of a horseshoe form, as in Fig. 1, the carrying-wheel being seen at J. Around the circular part of the table are arranged the type-cases K, being a series of narrow channels, each of the width of a type, and pointing toward the center of the type-carrying wheel, the inner ends of the channels terminating near the circumference of said wheel. The type-cases embrace about two-thirds of the carrying-wheel. The square part of the bed-plate forms a table, upon which stands the mechanism for distributing and composing, in connection with the type-carrying wheel, the right-hand half of said table being occupied by the former, and the left-hand by the latter. Upon the extreme left is the galley M, wherein the type, as fast as set up into lines, is formed into column, immediately adjoining which is a series of keys, L, consisting of buttons, the shanks of which pass vertically through the table, and actuate a series of levers and wires leading to the inside of the carrying-wheel, where they effect the set of the indicators by which the proper type is taken from its case and brought round to the setting-table, where they are deposited in a channel, *f*, and fed along toward the galley, to be formed into column.

On the opposite side of the table is another galley or bed, W, to hold the column of dead matter, or type to be distributed. At the head of this galley is a channel, *a*, which terminates at about the center of the table, and near to the periphery of the carrier-wheel, and tangent to said wheel.

By the operation of suitable mechanism, as a line of type is taken off the column that line is forced along the channel toward the carrier, so that as the first type is picked off and distributed the column is fed up, and when the first line is finished another line is taken off, and so on until the whole is distributed into the cases.

The manner in which the type is distributed, so that the proper case it is to go into can be indicated is effected by a system of nicks upon the shank of the type itself, whereby, before leaving the channel and being taken up by the conveyer on the carrying-wheel, certain parts are set in a given position, which indicates the proper case into which the type is to be deposited, so that the wheel holds onto the type until, by its revolution, the type arrives opposite the mouth of the appropriate channel of the set of cases first mentioned, when it is deposited therein, the type maintaining always its erect position.

Upon the face of the carrying-wheel are two sets of conveyers, *c* and *d*, one set, *d*, being for distributing only, and one, *c*, for setting. These are plates, so constructed and fixed to the carrying-wheel that, while the latter has a constant and unvarying motion, the former may be permitted to stop for a period, and then go on with the wheel, and also to overtake and reassume their former position.

On each conveyer is a pair of fingers to gripe the type, and also certain parts which effect the opening and closing the same, together with means for thrusting the type out of the conveyer.

The times for opening and closing the fingers for taking the type and for thrusting the type out are governed by two sets of mechanism. In the case of distributing, this is accomplished automatically, and is determined, as before remarked, by the nicks on the type; but in setting it is governed according to the will of the compositor who plays upon the keys. These conveyers are arranged around the carrier alternately—*i. e.*, first a setting-conveyer, and next a distributing-conveyer, &c. There may be eight or ten, or even more, of each kind to the wheel. These conveyers, when the machine is both composing and distributing, stop twice at each revolution of the carrying-wheel, as follows: The distributing-conveyers always stop at the end of the channel *a* leading from the column of type being distributed, and, having taken a type, stop again at the proper channel in the cases K for the letter they carry. The composing-conveyers stop at the channel indicated by the compositor through the keys, and stop again to deposit their types at the mouth of the channel *f* leading on the column of the galley.

This machine has also this peculiar characteristic, viz., that the compositor can compose ahead or faster than the type is delivered by the wheel. There is a twofold object for this: the one is that the carrying-wheel shall have a constant and unvarying motion without regard to any exactness of time in the compositor's playing of the keys; second, by being able to compose ahead, he is relieved from so constant attention to the copy, and may have intervals of time to look occasionally to see to the correct working of the distributing part, as also to justify his lines, and set the same into column upon the galley, besides affording a certain amount of physical relief. The continuous revolution of the carrying-wheel is therefore effected by an independent power of suitable character, and the speed of the same is to be such as to allow of the necessary time for the conveyers to operate.

1*st Division.*—Under this head will be described the mechanism for conveying the type from place to place, the arrangement and construction of the type-cases, with the mode of delivering and receiving the type in those, together with the various devices for indicating what types are to be thus delivered and received in the process of composing and distributing.

The type is carried to and from the cases upon the edge of a constantly-rotating wheel moving horizontally upon a central axis. This wheel, represented at J in the several figures, is not supported by its axis, the pin $k^9$, forming said axis, being merely to keep the carrier accurately in a central position. As the types are conveyed upon the circumference of the wheel by distinct conveyers, it is fitted to support them in the following manner: A frame is formed by the addition of a metal ring of the same diameter as the wheel J, and to which it is attached by a series of bars or pillars, thus leaving a space between the two sufficient for introducing the conveyers. This ring is shown in section at $f^5$, Figs. 2 and 3, in connection with the wheel J. The wheel J is supported by the ring, the lower side of which has a bead or rail, fitting into bearers fastened to the table. These, to reduce friction, ought to be rollers, an example of which is given in Fig. 23. Three or four such bearers are sufficient, if placed at equal distances apart at different points of the ring.

The wheel J is made to revolve by a toothed circle, screwed to the under side of the arms, as at *l*, into which a pinion, *k*, works, and which is driven from beneath by being geared to the main shaft S, as seen in Fig. 3.

The conveyers, which form an essential part of the type-carrying apparatus, are attached to the wheel so as to occupy the space between the ring $f^5$ and the rim of J. The general shape of these is that of a square plate slightly curved, a front view being given in Fig. 20, and a top view in Fig. 19, as well as in several other figures. One of these, in Fig. 20, viz., *c*, carries the type for setting, and the other, viz., *d*, carries those which are being distributed.

There is a slight difference required in the construction of the two, on account of the one being to receive type from the cases, while the other is to deposit them therein. In other respects both are required to go through the same set of motions upon the carrier. These motions are of two kinds. The one is a slight vibratory or rocking motion upon a center pin, by which the plates are attached to the wheel, said pin standing vertically; and a second, a reciprocating or sliding motion in the direction of the circumference of the wheel.

To understand the object of these motions, a description of the mechanism of the conveyers will be necessary, and, first, the mechanism for griping the type. This is formed of two principal pieces, the one stationary and the other movable, the two combined forming the cavity into which the type is placed for being carried. The stationary piece is placed near the upper right-hand corner of the plate, as in $q^5$, Figs. 19 and 20, and forms a projection beyond the face of the plate *c* or *d*. In the recess thus formed the type is placed, resting at the same time upon a small foot, $y^5$, Fig. 20. The other or movable piece is a bolt, lying horizontally and playing back and forth, so that one end may strike against the projection $q^5$. This bolt is seen at $x^5$, and thus when a type is placed against $q^5$ it may be brought up against the type, which is done by the force of a spring, and this constitutes the griper or finger, before mentioned.

Figure 19:
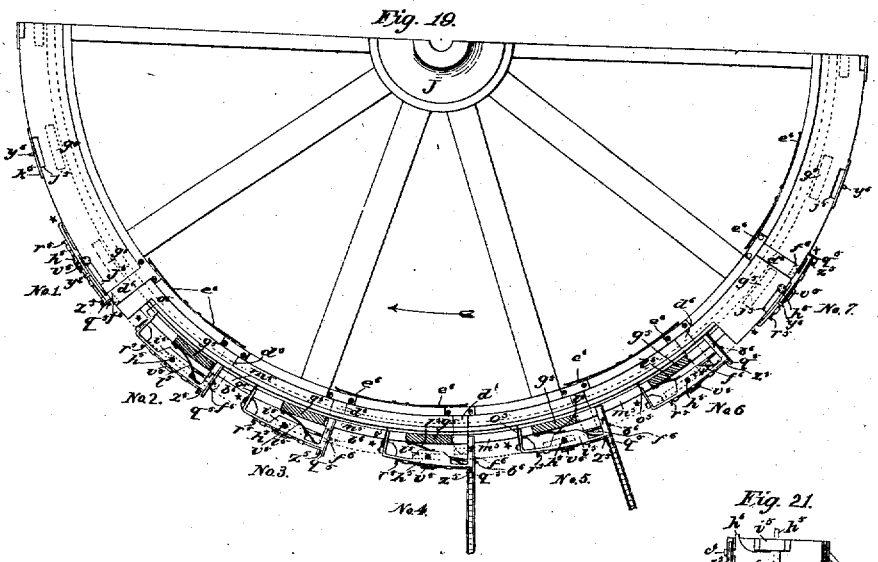
Figure 20:
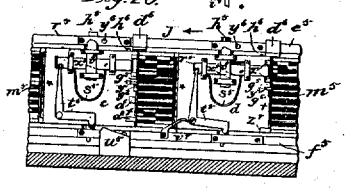

In the conveyer *d*, Fig. 20, this bolt is shown closed against $q^5$, and on C it is shown withdrawn, while in section No. 5 of Fig. 19 it is represented as grasping a type, and in section No. 6 without a type. The withdrawing of the bolt away from the fixed surface is effected by a cam-piece placed at the proper position on the table, and which strikes a cranked lever upon the conveyer as the latter is carried by on the wheel. The cranked lever is shown at $t^5$, Fig. 20, the upper end being attached to the back end of the bolt, as shown. The lower end lies nearly parallel with the bottom of the plate, and has a short toe, turned down to strike the inclined surface of the cam, which is shown at $u^5$.

The conveyer *d* shows the finger as closed; but as the wheel J moves onward in the direction of the arrow, when the toe of the cranked lever strikes $u^5$ the bolt will be withdrawn, as shown, by conveyer *c*, which has just passed by $u^5$. When the bolt has been withdrawn it must be kept so until the conveyer has arrived at the place where it is to take a type. As before remarked, it flies shut by the force of a spring, $s^5$; therefore a latch is provided, which catches in a notch, $x^5$, in the bolt, and thus retains it open. This latch is shown at $v^5$ lying across the bolt and standing vertically. It is kept constantly pressing upward by a spring, so that the moment the notch in the bolt has passed by to a sufficient distance the latch will fly up and take into the notch $x^5$. So soon as a type has been deposited upon the conveyer the latch must be disengaged, and for this purpose the upper end is beveled, so that a projecting pin, $y^6$, upon the wheel J, passing by at that moment, throws down the latch, and allows the bolt to spring forward against the type and gripe it firmly in place.

There is now to be described the means for discharging the type from the conveyers. Upon the griping end of each of these there is a plate, *x*, attached nearly at right angles to the face, as in Fig. 19, and along the inner side of this is a sliding piece or pusher, having a forked end, the two points of which project through the front, as shown at $z^5$, Figs. 19 and 20. When a type is in the gripers the ends are drawn back flush with the face-plate; but when the type is to be discharged these ends are pushed forward from behind, and thus thrown out.

Figure 21:
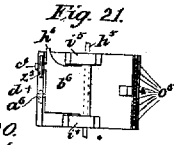

The object of having two or more forked ends is in order, that the type may be thrust off in its perpendicular position. The manner of working the pusher is by the piece $b^6$ (shown in the back view of a conveyer, Fig. 21.) It is a plate hinged upon the pin $h^5$, having a point, $h^6$, rising above the top edge, and another, $c^6$, which projects through the pusher $z^5$, as in Fig. 21. A spring under $b^6$ tends to keep the pusher always withdrawn. At the proper moment for discharging the type from a distributing-conveyer, which is when the griper is directly opposite the inner end of a type-case, a cam, $d^6$, upon the edge of the wheel J passes by, striking the tail $h^6$, and, by thrusting it forward, carries the pusher $z^5$ with it, thus throwing off the type directly into the type-channel.

Section No. 4 of Fig. 19 shows the act of depositing a type in its appropriate case. The cam $d^6$ consists of a movable bar, placed in a groove on the upper edge of the wheel J, as shown in top view in Figs. 1 and 19, and in edge view in Fig. 20. It is kept constantly pressing forward by the springs $e^6$, and is made movable, because at certain times its beveled ends must be able to pass by the point $h^6$ without striking, for at the moment previous to the conveyers receiving a type it has received an onward motion, which would carry point $h^6$ past the cam, and thus, unless kept out of the way, the type would encounter the ends of a pusher, and then could not be received upon the conveyer. To effect that motion the inner end of the bar $d^6$ has a toe projecting downward, and which rides over a fixed cam, $d^7$, Fig. 19^A, placed on the inside stationary excavated ring at the proper point to accomplish the object, and which point will be hereinafter described.

The above method of discharge refers to the distributing-conveyer. The setting one is slightly different, in that the piece $d^6$ does not effect this object; but the type is discharged by a lever placed in a stationary position, because a setting-conveyer must always discharge its type at one point, viz., at the galley-table and into the channel *f*, Fig. 1. At $w^6$, Fig. 1, this discharging-lever is shown. It is a right-angled piece, centered at $v^6$ to the permanent inside excavated ring. (Yet to be described.) The bent end passes through a hole in said ring, so that, by a forward movement given to it at the moment when the griper of a setting-conveyer is at the mouth $e$ of the channel $f$, the end $u^6$ will strike the back end of the pusher $z^5$, Figs. 20 and 21, and thrust it forward, thereby causing the points at the front to push the type off, when it will be received in the mouth $e$ of the channel. The setting-conveyer has, however, a plate, $b^6$, which is to operate another pusher, not in the distributing-conveyer at all, and the operation of this pusher is connected with the method of receiving a type from a case. It is shown at $a^6$ on C in Fig. 20, and it is also shown in dotted lines in Fig. 21. The point $c^6$ of the plate $b^6$, however, would, in this case, have to be made to pass through the pusher $a^6$, as shown in dotted lines, Fig. 21. There is a cam, $d^6$, therefore, to each kind of conveyers. In the case, however, of the distributing-conveyers, they effect the discharge of the type; but in the setting they effect the receiving of the type into the conveyer, in a manner to be yet set forth.

The arrangement of the conveyers on the carrying-wheel and their operation will now be described.

The necessity for the two motions given to the conveyers as they are carried round by J, as already mentioned, grows out of the fact that, inasmuch as the carrier has a regular and unvarying motion, the type could not, with any certainty, be deposited upon the conveyer were it carried around in like manner; hence, while receiving or delivering a type, the conveyer comes to a positive stop long enough to accomplish the purpose. Thus it lags behind for a moment, as before remarked; but so soon as the type is taken or discharged, it goes on and overtakes its first position upon the wheel.

The conveyers are placed in the space between the upper rim of J and the ring $f^5$, and their width is such that they fill that space. The lower edge rests upon this ring, and they are kept from falling out by a bolt or pin, which passes through the rim of the wheel and the ring below, and also to boxes in the back of the conveyers. These pins are shown at $h^5$, Figs. 19, 20, and 21, and elsewhere, and they do not pass through circular holes in the wheel or ring, but through elongated apertures or slots $j^5$, Fig. 19. It is thus seen how a conveyer may be permitted to stop for a moment while the wheel is in motion; for, if a pin, $h^5$, be at the forward end of a slot, its conveyer may stop during the time it takes for the wheel to travel over a space equal to the length of the slot. This length is therefore determined by the time it is required to take or deposit a type in connection with a given speed of wheel within a certain limited extent. The other motion of the conveyer is a vibrating or rocking one upon the pin $h^5$ as an axis. The opposite ends of the conveyer, in vibrating, approach and recede from the face of the wheel. The face-plate of a conveyer, as already mentioned, is slightly curved, which curve coincides with the edge of J, as in Fig. 19; and when the conveyers are moving along with the same, their position is such that the two curves are concentric, as in sections Nos. 1 and 7 of Fig. 19. As the open ends of the type-channels stand a little distance away from the conveyers, it is necessary, before a type can be delivered or taken away from the same, that the gripers be made to approach so near that the type cannot escape from passing from the one to the other. To do this, then, is one object for the rocking movement of the conveyer upon the pin $h^5$.

In Fig. 1, at section $K^1$ of type-cases, a setting-conveyer is represented with the griper end projected outward, joining the end of a channel, and is in the act of receiving a type. The moment when a distributing-conveyer shall project its griper end forward to receive or deliver a type is governed by the distributing mechanism, being automatic or self-operating, and for the setting-conveyers by the action of the compositor. The conveyers are made to vibrate back and forth by the action of springs upon their inside surfaces, so arranged that the same spring throws out the griper end and also causes it to return.

This will be illustrated by Fig. 19, where a feather-spring, $l^5$, is fastened to the column $g^5$, so that its free end will press upon the back of the conveyer at that part, where it is made thicker to form a hole for the bolt $h^5$ to pass through. As the conveyer with this bolt slides along the wheel to the extent of the slot $j^5$ the point of pressure of the spring is transferred from one end of the piece upon which it presses to the other, and, doing so, transfers its action to opposite sides of the bolt $h^5$. In section No. 2 it will be seen that the position of the conveyer is such on the carrier-wheel that the bolt $h^5$ is at the extreme forward end of the slot $j^5$. In that position the spring $l^5$ rests against the extreme end of the plate upon which it travels, and at the farthest distance from the bolt on that side; hence its force is exerted to throw out the griper end of the conveyer. This, however, is prevented by the opposite end pressing, by its indicator-points (not yet described, but which are shown at $o^5$, Fig. 10) against the surface of the excavated ring $m^5$. (Also yet to be described.) As the wheel goes on, a place is reached where there is an excavation in the ring conforming to the set of the said points, and accordingly they sink into it, as there is no further resistance to the spring, and thus the griper end is thrown out, which can only be done when said griper will be opposite to some spot where it is to take or deliver a type. At such point the conveyer is caught by a stationary hook, which strikes against a projecting piece, $g^6$, Figs. 20, 22, 23, 24, and its further onward motion is thereby arrested. These hooks may be seen at $x\,x$, Figs. 1, 22, 23, 24, there being one at the mouth of each type-channel. Being thus held fast, and the wheel continuing on, the bolt $h^5$ will slide along the slot $j^5$, sections Nos. 4, 5, and 6 of Fig. 19 showing different stages of the progress along it. At No. 6 it has traversed the whole length, and the spring will then be seen pressing on the opposite side of the bolt to that in section No. 2, and hence the force is directed to throw the indicating end out, and the griping end inward, which it accordingly does, and the conveyer, being thereby released from the detaining-hook $x$ $x$, continues on with the carrier-wheel, having in this interval either taken or discharged a type.

The excavated ring and indicator-points on the conveyer will be described together, as they act in conjunction. The first is a broad flat ring, of moderate thickness, and is of such diameter and width that when secured in place upon the table it shall fit just within and under the carrier-wheel J. It is shown in section at $m^5$, Figs. 2, 3, 10, 22, 23, and 24. In constructing it, a portion of the outer surface has a series of grooves cut upon it, of equal width and parallel to each other, as seen in the enlarged view of a portion of the ring in Fig. 12. The excavations are made in the grooves by cutting slots of different degrees of length and after a certain order, but having an irregular general appearance, as shown in Fig. 20. The conveyers are placed upon the carrier-wheel so as to stand opposite to the line of excavations, as in Fig. 10. The indicator-points are pieces fixed to the conveyers on the end opposite to that of the gripers. They are a series of separate pieces of pointed metal, and are attached to the end plate by pins, and as represented in Fig. 10, at $o^5$. The points project toward and are intended to press into the grooves in the ring $m^5$, a section of which is also shown.

The points $o^5$ are not pinned rigidly to the conveyer, but must be able to have a movement. Each one is therefore provided with a friction-piece, to cause it to stand in any position that may be given to it. On the ring there are two grooves to each indicating-point. Thus on Fig. 12 eighteen grooves are shown, while in Fig 10 there are nine indicator-points exhibited, and it is by shifting these points so that they will track into these different grooves, according to a set given them at a definite starting-point, that the proper indications are formed for depositing and taking the type from the cases. In every revolution of a conveyer it passes a place on the excavated ring where these points receive a set, which may be called a "zero," and from which place a new set is given for a different type than the one previously carried, or, in fact, even if it is to carry again a second type of the same character as the former one. This is accomplished by placing a row of inclined planes in each alternate groove, as shown at $g^7$, Fig. 12. Beginning at the bottom, they are numbered 9 8 7 6 5 4 3 2 1, and the intermediate grooves are represented by 0. As each indicator-point has two grooves, into which it may play, some may have been previously put into the grooves 0, and some allowed to remain in those bearing the numbers 9 8 7, &c.; but it is intended that at each revolution all the points shall be set so that there shall be one point bearing in each of the grooves 0 and none in the others. Suppose that as a conveyer approaches, (which it will in the direction of the arrow,) all its points had been previously set by the indicator, so that they rested in the grooves 9 8 7 6 5 4 3 2 1, respectively, all these points would be intercepted by the inclined planes $g^7$, and, as the surfaces of these incline upward, the points would slide up and they all would be turned on their pivots and set so as to ride into the grooves 0—that is to say, the point in groove 9 would be turned into $9^0$, point in No. 8 into $8^0$, &c., throughout.

The indicators are a device for afterward shifting these points, or a portion of them, back again from grooves 0 to those marked by the numbers 9 8 7, &c. Suppose an excavation in the ring, which would be indicated by merely shifting one of the points, allowing all the others to remain as they are, as from 9 to $9^0$, which would be performed by the indicator acting only upon such point to effect its transference. These indicators are small inclined planes, precisely like those already described, and project through the ring into the channels in the same; but there is this difference, that they are movable instead of being fixed, as the others are, in order that they can be withdrawn below the surface of a groove. In fact, in their normal position they are all below such surface; secondly, they occupy, also, or act within, each alternate groove, but are situated in the grooves 0, as seen at $e^7$, and their inclined surfaces project downward, the reverse of $g^7$, as shown.

Each indicator $e^7$ is attached to a plate, $d^7$, Fig. 12, which is pivoted at one end, and all are secured to the inside of the excavated ring.

There are two sets of indicators in the ring. One set is acted upon automatically by the distributing mechanism, and the other by the compositor. As by the stationary inclined planes $g^7$ all the indicator-points are shifted into the grooves 0, so by the indicators $e^7$ may they all be shifted from said grooves 0 to those numbered 9 8 7 6, &c.

By suitable mechanism any of these indicators may be moved forward, so as to oppose their action to the points.

In Fig. 10 is a section of the excavated ring through the line of indicators $e^7$, and it will be seen that the lower three are projected forward and have acted upon three of the lower indicator-points, and have transferred them from $9^0$ $8^0$ $7^0$ to 9, 8, and 7; and if, for instance, that be the indication for the letter $a$, the conveyer would move on until it arrived at the case or channel containing said letter, where would be found excavations in the ring suitable to allow all the points to sink in, as shown in Fig. 10[A], when the conveyer would be immediately arrested, and the type taken or deposited, according as it was a setting or distributing conveyer acted upon, as already described.

Before a conveyer can receive a type or deposit one, the bolt $h^5$, on which it turns, must always be in the advancing end of the slot $j^5$, or as shown in Fig. 19, section No. 1, because while doing so the conveyer must stop, and the carrying-wheel, by continuing its motions, slides, as it were, past the conveyer, that having been arrested by a fixed stop, $x$ $x$, Fig. 1.

To regain its former position at the head of a slot, there is a curved sliding bar fixed on the inside of the excavated ring, as seen at $n^6$, Figs. 1 and 3. At one end a spring, $O^6$, constantly pushes it in the direction in which the carrier J revolves, and upon the top of this bar there are two pawls, $p^6$ and $p^6$, Fig. 1, situated a short distance apart. The points of these project forward through slots cut at this place in the excavated ring. The bar has its return motion against the force of the spring given to it by two cams, $j^6$, upon the vertical shaft which comes up through the bed to drive the pinion $k$, which propels the carrier-wheel. These cams strike a lever, $l^6$, the forward end of which gears into the bar, and thus drives it back. When the cam clears the pin $k^6$ the spring acts to throw the bar forward, which it is permitted to do with considerable speed by the abrupt angle of the cam at this place. The movement of this part is so timed with that of the wheel J that a conveyer is always in position to receive the action of the two pawls at the moment the cam $j^6$ releases the bar. As the speed of the bar in a forward direction is much greater than that of the carrier J the points of the pawls $p^6$ drive forward the conveyer to the forward end of the slots again.

These pawls are like latches, the points being always pressed forward by a spring, so that the point, as it strikes any obstruction, retreats, and springs out again so soon as it has passed over the projecting edge of the conveyer, at which moment the cam releases the spring $O^6$, and thus it is carried forward again, taking the conveyer with it. These two pawls are situated at the front part of the machine.

The mouths of the distributing and setting channels $a$ and $f$ are quite near to each other, and it is intended that the first of these pawls shall push forward all the conveyers before they arrive at the mouth of either channel, while the second pawl is situated so as to act upon all the conveyers after they have passed by said channels. From what has been said before, the necessity for this is obvious, for as each conveyer has, in passing round the whole circuit, stopped at some type-case either to receive or deposit a type, it will be seen that they approach the type setting and distributing channels with their pivots $h^5$ at the back ends of their slots $j^5$, so that before they can act again at those places they must all be advanced to the forward ends of said slots. This is done by the first of the pawls $p^6$ and the bar $n^6$.

A type-setting conveyer, $c$, Fig. 1, having in its circuit received a type, must be advanced in order that it may stop to deliver it. It is shown as just in the act of being advanced by the pawl $p^6$, which will take place when the cam $j^6$ leaves the lever $k^6$. It is now supposed as having arrived at the mouth $e$ and delivered its type. By this act it has again traveled to the back end of the slot, as shown, and at this moment the sliding bar again moves forward, and the second pawl $p^6$ pushes it to the head of its slot once more. Thus by one movement of the bar two conveyers are advanced—one preparatory to action, and the other subsequently thereto. By an inspection of Fig. 1, it will be seen that all the conveyers, before they reach the type-cases, are on the forward ends of their slots, but on leaving are all in the back ends thereof.

The type-cases or depositories may be divided into three classes: first, for the regular type; second, for the irregular, and third for the excess. The regular cases are to receive the type ordinarily employed. The irregular are intended to contain such type as are but seldom used, including the thin or justifying spaces, and which are to be put into the lines by hand. The third is a provision whereby, in case the distributing part has continued so long that the regular depositories are filled, the excess may be received here.

These last cases, therefore, will receive promiscuously any type presented by a conveyer, whereas in the regular cases none but the correct type can be deposited.

The regular type-cases are narrow channels, formed by setting up upon a flat bed, $h^7$, two plates, forming parallel sides. One of these sides is comparatively thick and rigid, while the other may be thinner. The space between these is wide enough to receive the type edgewise, and therefore they differ in width to suit the different letters. The inner end, or where the types are received and discharged, is of a peculiar shape, and is fitted to partially close the opening in order to prevent the type falling out, as well as to readily receive the same.

Figure 22:
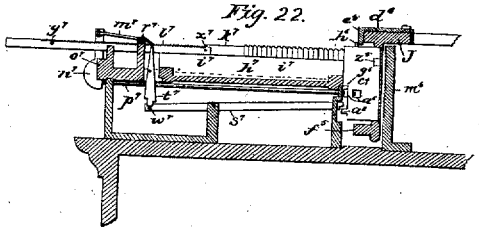

In Fig. 22[A] is a top view of a type-channel, $i^7$ being the thick side. At the mouth this is beveled inward, as shown, while the opposite or thin plate is bent as a spring, forming, a little within, a narrow throat.

It will be seen that so soon as a type is thrust past this it will be so secured within the channel that it cannot fall out, except by the action of a positive force. A certain number of such channels is arranged upon a bed-plate, and placed so that they radiate from the axis of the wheel J as a center.

In Fig. 1 are shown six beds of type-cases, forming as many sections, as shown by the letters $K^1$ $K^2$. These sections, with the types, may be wholly detached from the machine without disturbing any other part, and others containing different fonts substituted.

The irregular cases are cups, as N and O, placed, respectively, at the beginning and ending of the regular cases, as shown. These are to receive, in a manner to be hereinafter shown, everything not intended for the regular cases, and when anything therein is to be used the compositor must pick it out by hand.

The case for the excess is a channel. (Shown at Q.) Its mouth has a different formation from that of the regular cases, as it does not deliver types, and it is intended to open and thrust along the types by a positive motion. This only receives type from the distributing-conveyers, and hence it does not have provision for effecting discharge to a conveyer. All the regular cases both receive and discharge type.

The channel P may be to some extent considered as an irregular case, since it has no provision for delivering type onto a conveyer. Its use is to receive only quadrats, and in this view it is, in fact, a regular case; but as these types are inserted by the hand of the compositor when required in the lines, and are never brought by a conveyer, it needs only provision for receiving, and therefore this channel is situated, as shown, near to the hand of the operator.

In receiving a type into the regular cases, the provision for thrusting it in is upon the conveyer; but the discharging is effected by a separate mechanism attached to each channel, as follows: In the channel back of the line of type there is a block, which presses squarely up against the rear one. This block is propelled forward by a rack-and-pawl feed.

Figure 23:
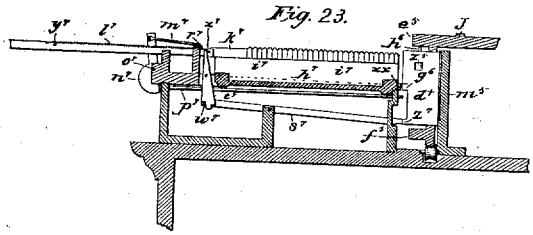
Figure 24:
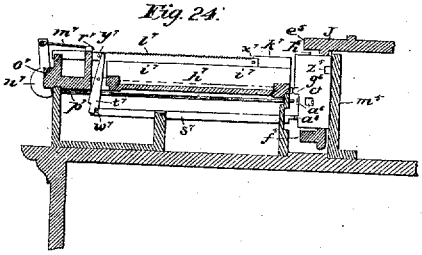

Figs. 22, 23, and 24 show enlarged sections of a portion of the type-bed. At $R^7$ is shown the block just named, at $l^7$ the ratchet, and the pawl at $m^7$. The pawl is affixed to the top end of a pendulum-lever, standing vertically, and having its lower end weighted at $n^7$. Below the bed $h^7$ there lies a rod, $p^7$, the back end of which abuts against the lever $n^7$, while its forward end projects a little beyond the inner opening of a type-channel.

In Fig. 22 a setting-conveyer is represented as having stopped to receive a type. On the conveyer there will be seen, at $a^6$, a small bolt constituting a pusher, just touching the end of the rod; and to the inner end of this bolt is attached the swinging plate $b^6$, already described under Fig. 21. As the carrier J moves along, the point of the slide $d^6$ will strike the top point $h^6$ of the swinging plate and push it forward. This also pushes out $a^6$, thus thrusting back the rod $p^7$ and end $n^7$ of the lever. The pawl, taking into the ratchet, pushes that in the contrary direction or toward the conveyer, and thus thrusts the whole line of type forward the distance necessary to push one type into the gripers upon the conveyer. By this time the latter has moved along its slot so far as to cause the tilting-spring $l^5$, Fig. 19, to act upon the opposite side of the bolt and throw in the griper end of the conveyer, whereby it is disengaged from the stationary hook $x$ $x$, and the whole goes on with the carrier-wheel, including the type. The weight $n^7$ now causes the lever to withdraw the pawl and push in the rod $p^7$, as at first, and as shown in Fig. 23. In every return of the pawl its acting end is lifted and kept clear of the ratchet by having its curved end brought into contact with the edge of the rim $r^7$, Fig. 23. The reason for this is that it must be out of the way when the depositing of the type takes place from a distributing-conveyer.

In a font of type there are many more of some letters than of others; hence in arranging them into the cases several channels or cases will be required to contain the most numerous, while a single one may suffice for the fewest. Thus, for instance, it might require three channels for the letter "a," while one would suffice for the letter "x," &c. The operation of a conveyer is such that it always stops at the first channel, where there are several having letters of the same name, and takes from that, or deposits therein, as the case may be, until it is emptied, or filled. It will then go on to the next, &c. In distributing, then, a conveyer will carry all the letters "a" and begin to fill, say, the first channel, Fig. 1. When that is filled it will go on to the next, and fill that, and so on, and in case there are still more "a's" than the channels devoted to that letter can hold, the conveyer will continue all round, and finally deposit it in the channel of excess, Q, as before named, which will therefore receive every letter which cannot be got into its proper channel. The setting-conveyers will, in like manner, draw from the first channel until empty, and then go on to the next of that set, and where by chance the whole of a letter has given out the conveyer will come round empty, but will stop at the composing-channel just the same as if it had a letter to deliver. These results are accomplished by means of a device attached to each channel, the effect of which is to prevent the griping end of the conveyer from tilting forward when it comes opposite to the mouth of a channel at which it cannot act; as, for instance, a setting-conveyer has been set to indicate the letter "a," the moment it arrived at the first of the series of channels containing that letter the indicating-points would drop into the excavation in the ring proper for said letter. Now, if that channel were empty, by means of the mechanism to be described the conveyer would be prevented from tilting forward, and consequently could not be engaged by the detaining-hook $x$ $x$. It would, therefore, pass to the next, and if letters were there it would be allowed to come in action. The same would occur with a distributing-conveyer—if the case were full it would go on to the next, and if all were full it would come round and deposit in the channel Q of excess.

At $s^7$, Fig. 22, is a lever supported out of its center, so that the inner end is longer than the outer; thus that longer end will always fall by reason of its greater weight. Directly over the shorter end is suspended a pendulum-lever, $t^7$, called so because it is free to swing back and forth, having its lower end heaviest. The top of this lever stands alongside of the ratchet $l^7$, as shown.

On its lower end two notches are formed, the notch on the back being higher than that on the front, and between these the bottom of the lever is cut square. In the extreme end of $s^7$ there is a pin, $w^7$, and there is also a like pin at each of the ends of the ratchet-piece $y^7$ and $x^7$. The natural position of the pendulum-lever $t^7$ is to hang vertically, and when in that position the pin $w^7$ will be caught under the square end, as in Fig. 22, the opposite end of $s^7$ being then kept elevated. Upon the front edge of the ring $f^5$ there is a tripping-cam, (shown at $v^7$, Fig. 20.) This, as it is carried round by the ring, will strike the inner ends of all the levers $s^7$ and lift them, they dropping again after it has passed. This horizontal lever has three positions, the first (as seen in Fig. 22) when the pin $w^7$ rests on the bottom of the pendulum $t^7$; the second when the pin $w^7$ rests in the back notch, as in Fig. 23; and the third when the pin $w^7$ rests in the front notch of $t^7$, as in Fig. 24. The pendulum $t^7$ having, therefore, three positions, these effect the giving off by or the receiving of type into the channels. When the lever $s^7$ stands as in Fig. 22, type may be either taken from or received by the channel; when as in Fig. 23, type may be taken from, but cannot be received by, the channel, because it is then quite full; and when as in Fig. 24, the channel being empty, a setting-conveyer must not stop there, though a distributing one may.

As the distributing-conveyer deposits the last type that a channel can contain, it pushes thereby the ratchet $l^7$ back so far that the pin $x^7$ strikes the top of the pendulum $t^7$ and moves it back, thus allowing the pin $w^7$ to fall into the back notch, Fig. 23. The front end of $s^7$ will then stand directly opposite to a projecting point placed upon all the distributing-conveyers at $z^7$, and thus a conveyer having a proper type for that channel will not be able to tilt forward to attempt its deposit, by reason of the interference of the lever $s^7$, as in Fig. 23. When a channel is empty, the setting-conveyer will be prevented from stopping by the pin $y^7$ striking the pendulum in the opposite side, and thus the pin $w^7$ will fall into the inside lower notch. This will support the lever $s^7$ in another position, and, in so doing, it will be opposite to a projection, $a^8$, on all the setting-conveyers, as in Fig. 24, but will not interfere with the projections on the distributing-conveyers. The lifting of the inner ends of the lever $s^7$ is to allow of the shifting of the pin $w^7$ to the different notches in the pendulum, according to circumstances. When the setting and distributing go on regularly together, the types are so proportioned that they are taken from and deposited in the cases so as to keep those properly supplied, and therefore the usual position of the stop-lever $s^7$ is that shown in Fig. 22, and in that position it is clear of either of the projections just named.

As before remarked, when a type cannot be deposited in its appropriate channel or channels, it is to be carried on and deposited in the channel of excess, and this is accomplished by having, at that channel, such form of excavation in the excavated ring as to allow the conveyers to act upon all combinations of the indicating-points. The channel Q of excess, and that for quadrats P, have, at their mouths, a device for receiving the type from the conveyers, whereby the type is thrust in and the opening is immediately closed. These are seen at $m^3$ and $n^3$ in Fig. 1, and in detail in Figs. 28 to 30.

At $b^8$ is a bolt, which is drawn back by a lever, $c^8$, worked by a cam on a shaft beneath the table. The cam revolves regularly, being timed to withdraw the bolt as often as a distributing-conveyer has passed. This, however, may not be necessary, since those conveyers may have already deposited their type in its proper channel.

If this had been done they would be at the back end of their slots $j^5$ when approaching the mouth of the channel of excess, and consequently not in a position to deposit therein. When, therefore, one revolution of the cam has withdrawn the bolt, it remains so until a type has been deposited in the mouth, being, during that time, locked by a pin, $c$, on the latch $i^8$. At such time the mouth is, in effect, open to receive a type, though in order to prevent the one last put in from falling out, (as by the jarring of the machine it might be apt to do,) there is a piece (seen at $j^8$) made to slide at a right angle across it, and to remain there until pushed away to deposit another type. The end of the latch $i^8$ terminates under the head of this slide, as seen in dotted lines in Figs. 28 and 29. If, now, an approaching conveyer has a type to be deposited, being at the forward end of its slot, that conveyer will be acted upon by its indicating-points finding a place on the excavated ring into which they can enter. The type is discharged by the piece $d^6$, Fig. 1, which thrusts it off, in doing which the slide $j^8$ is pushed back, disengaging thereby the pin $c^1$ from the bar $b^8$, and this, then, by the force of the spring $z^8$, returns and drives the type into the channel. The cam now acts again on $c^8$ to withdraw the bar $b^8$, the slide $j^8$ returning to its place across the mouth by the force of the spring $l^8$.

The cam below is constantly in action; but when the bar $b^8$ is withdrawn, the lever which acts upon that is at the extent of its throw, and therefore at that time only the point of the cam touches it at each revolution, and without imparting any motion until the bar has been again disengaged. If, now, the next conveyer is at the back end of its slot, it will pass without disturbing the position of the several parts of the mouth; but if at the forward end, having a type to deposit, these movements will be repeated, as described.

*2d Division.*—The distributing mechanism being the second head, will now be described. The parts for this occupy chiefly the right-hand side of the table, in front of the carrier and type-cases, and by inspecting Fig. 1 the principal parts visible may be embraced generally in the space inscribed by the line X E. Opposite to X stands the apparatus for actuating the the set of the indicators, thereby determining the destination of each particular type. The distributing-channel *a* will be seen to terminate at the inside corner of its frame. Adjoining this, at W, is the feeding-table, for supporting the column I of type, and to or near which are the several parts for actuating the feed. At the head of the feed-table there is an abutting plate to the main bed-plate, so as to stand a little distance off, or as seen at the letter *y*, Figs. 1, 8, and 9, and which forms a portion of the type-channel *a*. On the inside and parallel to this is the other plate, to complete the channel, as at *z*. This plate is supported above the table W, and stands so high as to allow the column of type to pass beneath its lower edge. Its ends are attached to columns $a^2$ in the same figures and it can also be moved to and from the other plate, *y*, by set-screws $c^2$. From this it will be understood that the lines of the type, by passing under *z*, get into the channel from beneath, a whole line being passed up at a time. This is done by a sliding floor, which rises at the proper time, lifts the line, and supports it in that elevated position until the line is exhausted, when the floor descends, a feed of the column takes place, and another line is lifted up into the channel, and so on.

In Fig. 5 is a section through the line E F of Fig. 1, and just back of the distributing-table, but showing the parts toward the front of the machine. In this $w^3$ represents the sliding floor, being a thin plate, which stands between the end of W and the fixed channel-piece *y*. When lowered its top edge is flush with the feeding-table, and forms a continuation of it.

At $v^3$ are two legs, descending below the bed and terminating in the frame $o^3$ of Fig. 5, which performs the raising and lowering. When a line of types has been raised into the channel, they must be fed along toward the place of discharge. This is accomplished by a pushing-ratchet, $m^2$, Fig. 1, which is urged forward by the check $g^2$ upon a vibrating arm, $s^2$, actuated from beneath by a cam, $w^2$, Fig. 6, upon the shaft T. There is a coiled spring, $o^2$, attached to the end of the ratchet, which tends always to pull it back. To prevent this there is a check-click at $p^2$. The throw of the click $g^2$ must constantly vary, to feed for type of different thickness. The force, therefore, which urges the click along is a spring pulling upon the arm $u^2$, Fig. 5, and which keeps the end of the arm constantly pressing upon the cam $w^2$, so that when the cavity shown passes by, the friction-roller sinks in, and a feed is given. As a type is thrust from the end of the line, the whole are fed along until the gap left is closed, the types then striking against a positive stop. Thus the depth of the cam is deeper than required for closing up the gap left by discharging the thickest type. At $v^2$ is a stop for holding the click out of contact with the cam, and thus the feed can at any time be arrested.

By moving the lever $z^2$, Fig. 1, back and forth between the two holes *z* and $z^1$, the engaging and disengaging are effected. When a line has thus been fed off, the ratchet-clicks $g^2$ and $p^2$ will be disengaged, and the spring $o^2$ allowed to pull the ratchet back, and a feed of a whole column of type, I, will take place, and the next line be elevated into the channel *a*. Figs. 1, 4, 8, and 9 will be involved in the explanation of this part.

It will be seen in Fig. 1 that the feeding-table W is of greater width than the column of type represented thereon. Each side of the table has a gage-plate, and the column is placed to fit against the plate on one side, while, to fill out the space on the opposite one, a block, *q*, is introduced and fitted, so as not to press or squeeze the type. At the foot of the column there is also a small block, *r'*, and of the same width, Figs. 1, 8, and 9. Extending quite over the table is a cross-bar, *r*, the two ends of which are attached to toothed racks *r''*, lying parallel to the sides of the table, as shown. Working into these racks are two wheels, *t*, (shown in dotted lines, Figs. 8 and 9,) and adjoining which are two ratchet-wheels, *s*. These are all upon one shaft, which lies beneath the table, and extends from side to side. At the extreme ends of the shaft are hung two levers, *u*, having upon them, in proper position for taking into the teeth of the ratchet, a pawl, each as shown at *v*. Upon the end of each of these levers is a link or connecting-rod, *w*, suspended by lengthened slots, (indicated by the dotted cross-lines in Figs. 8 and 9,) and these rods pass through the bed-plate and terminate in a frame, *x*, as represented in the several figures. This frame is hinged at $p^3$, near the back end, and, consequently, a portion of its weight is sustained by the levers *u*. The frame is raised up by means of a cam, $g^3$, upon the main shaft S, but falls by its own weight.

The feeding up of the column of type can now be readily understood. As the cam $g^3$ lifts *w*, these latter raise the levers *u* and cause the pawls *v* to take a next ratchet-tooth, as in Fig. 8. The dropping of the frame *x*, as in Fig. 9, turns the pinions *t*. These, acting upon the racks *r''*, pushing against the cross-bar *r*, force up the column of type until the top line strikes the plate *y*. This line must now be elevated to the position shown in Fig. 8. During the time that the line itself is being fed off the frame *x* is held up in its elevated position, and only drops down at the moment of giving the feed of the column. It is kept up by a swinging hanger, $a^3$, which performs also the operation of disengaging the clicks from the ratchet $m^2$. At the lower part of this hanger there is a notch-rest, upon which the frame $x$ is held by a supporting-pin, $h^3$.

The corner of this rest is rounded or beveled, as at $i^3$. The hanger extends above the pin $b^3$, upon which it swings, the top terminating just under the ratchet $m^2$; therefore it can swing back and forth without interfering with that ratchet. At one side there is a bolt, $d^3$, kept constantly pressing upward by a spring, $e^3$, at the bottom; and at the back of the hanger there are two feather-springs, $g^3$ and $k^3$. The spring $k^3$ is stiffer than the other, and it is acted upon periodically, while $g^3$ is constantly tending to press the top of the hanger forward. At $f^3$, Figs. 1 and 5, there is a small wedge attachment to the ratchet. This is an important piece, as it effects the unlocking of the parts which caused the feed of both line and column. While the line is being fed off the hanger $a^3$ stands vertically, as in Fig. 8, and is kept in this position by the bolt $d^3$ pressing against the side of the ratchet $m^2$. By the time the line of type is fed off the wedge $f^3$ has arrived at the place where the bolt $d^3$ stands. (Best seen in Figs. 1 and 5.) Continuing on, the wedge strikes the top of said bolt and depresses it below the ratchet, when, by the force of the spring $g^3$, it will be thrown under. The hanger thus swings so as to bring the supporting-pin $h^3$ on the edge of the inclined plane $i^3$. At this part a cross-bar, $j^3$, at the top of the hanger (seen best in Figs. 1 and 5) strikes against the two clicks $g^2$ and $p^2$, the ends of which project below the bottom of $m^2$; and the pin $h^3$, sliding down the inclined plane $i^3$, moves the hanger still farther, and thus effects the disengagement of the clicks. The object of the incline $i^3$ is for the purpose of assisting the spring $g^3$ by the force derived from the weight of the end of the frame $x$. The frame now drops down, as in Fig. 9, and the ratchet $m^2$ flies back by the pull of the coiled spring $o^2$. When it has gone far enough to bring the driving end clear of the line of type, the bolt at the top end of the hanger $a^3$ must come from under and take its place again, as in Fig. 8. Upon the ratchet there is another wedge, which is movable, and may be clamped at different positions. It is shown at $l^3$. As the ratchet flies back the point of the wedge enters under the spring $k^3$, and increases its tension so much as to overcome the force of the lower spring $g^3$. If there were no obstruction the hanger $a^3$ would become perpendicular at once; but it will be seen that the pin $h^3$, Fig. 9, keeps the bolt still under $m^2$. This it must do, because, although the column of type has been fed up, the line at the top has not been raised into the channel. The cam $g^3$ now lifts the frame $x$ to a certain height, when it will engage the ends of another, and interior, frame, $o^3$, which will now be carried along with it in its ascent. The engagement is by means of two springs, $x^3$, the projecting ends of which rest upon the cross-bar of $x$, as in Fig 4. To this latter frame the type-lifting floor $w^3$ is attached by the rods $v^3$, as in Fig. 5. The frames now rise together to their full height, and the line of type is raised vertically from the position shown in Fig. 9 to that in Fig. 8. As the last part, the pin $h^3$ gets clear of the edge of the lower part of the hanger, and the spring $k^3$, together with its weight, causes the hanger to fall now into a perpendicular position, as in Fig. 8. The clicks $g^2$ $p^2$ being by that act re-engaged, the feed of the line of type immediately commences.

It must be understood that the shaft S is in a constant revolution. All these changes have, therefore, taken place in a moment.

It will be observed that the interior frame $o^3$ is lifted by the springs $x^3$, and in most of the moving parts the connections are, in some form or other, capable of being relieved by springs, as safeguards.

Thus, in case from any cause the types stick too hard together to be easily broken from the column, it will be seen that the springs would give, and thus a breakage be properly avoided. There is a part, however, not yet described for relieving the pressure at which the column of type was left when fed up against the plate $y$.

When the column is first fed up it is not allowed to strike said plate, but strikes a movable plate, which is let in from the back, and which is made to protrude beyond the face inside to a very slight degree, but receding again so soon as the weight of the frame $x$ is taken off the rack $r^4$. Thus the top line can be raised free from obstruction.

In Fig. 5½ is a horizontal section through the plate $y$ at the place of the insertion of the false plate. (Shown at $d^2$.) At $e^2$ is a slide with wedge-shaped ends, lying behind it. $l^2$, Fig. 5, are two springs attached to $d^2$, tending to pull it backward. $i^2$ is a standing bar, connected with the frame $x$ at one end, and at the other to the slide $e^2$ by means of a pin, $k^2$, which plays in a crooked slot in $i^2$. The bar is kept in position by a guide-strap, $j^2$, which embraces it. As the frame $x$ drops down, the pin $k^2$ plays along the crooked slot $h^2$, moving thereby the sliding bar $e^2$ laterally, and thus bringing the wedge-shaped ends under the confining-straps $g^2$, and then the false plate $d^2$ is thrust forward, so that, when the column of type is fed up, the top line will strike against said plate. On raising the frame $x$ the wedges on the bar $e^2$ will be withdrawn, and the plate $d^2$ will retreat before the line of type begins to be raised by the lifting-floor. Thus when the latter does come into action it will find the line of type free to rise without friction or pressure. As each type leaves the advancing end of the line it is received upon a platform at the right-hand inner corner of the box containing the indicating mechanism, which box is placed upon the bed at the position of X, Fig.

1, and is shown also in detail in figures from 10 to 18, inclusive.

Before the type is taken from this place by a distributing-conveyer, the indicators $e^7$, Fig. 12, must be set to act properly upon the indicating-points of that conveyer. This is accomplished by a system of sliding bars and levers, which are brought into play by means of certain nicks cut in the shank of the type, each type having a certain order of nicks, whereby both their thickness and their denominations are ascertained by the machine.

Figure 27:
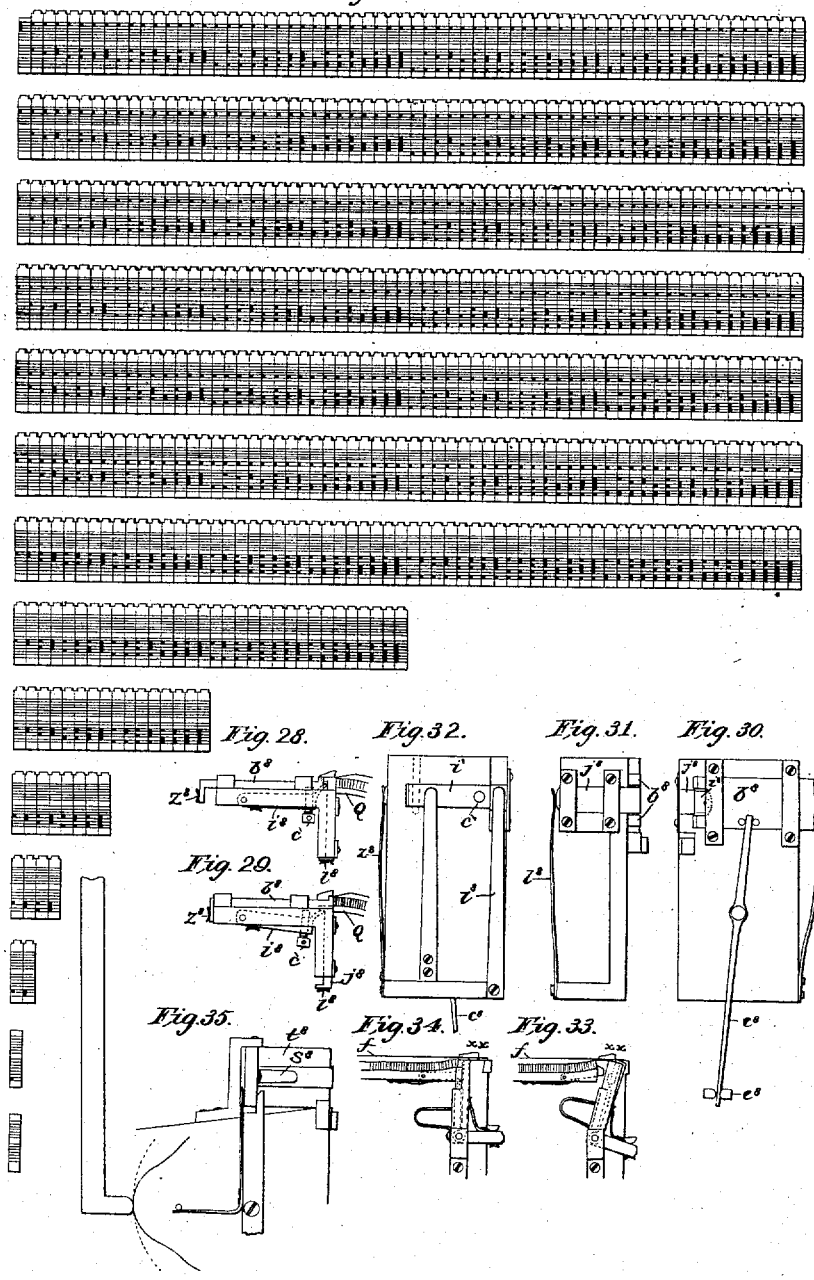

In Fig. 27 is shown a theory for a complete system of such nicks. These, it will be seen, are divided into two groups, and consist of incisions or cuts upon the edge of each type within spaces formed by certain lines, of which the upper set is within seven lines and the lower one within eight lines, forming six spaces for the upper and seven for the lower.

In the box X there are thirteen thin and nicely-constructed levers, supported in a horizontal position, all upon one axis, and are, furthermore, arranged in groups, so that the projecting ends will coincide with the spaces formed upon the types. Six of the levers belong to the upper set of spaces, and seven to the lower. These are shown at $z^3$, Figs. 13, 14, and 15. Figs. 13 and 14 are top views, and 15 is a side view, a portion of the levers being in dotted lines.

All the levers are held in a frame, $y^3$, which is contained in a chamber formed at the end of the box. A side view of $y^3$ is given in Fig. 18, the end of the box being removed. The fulcrum-pin of these levers is $a^4$, which, it will be seen, divides them lengthwise unequally. The frame has play back and forth in its chamber, and, when moved, carries the levers with it. At the back end is a graduated stop, which arrests the movement of the frame in one direction by the tails of some of the levers striking it. It is graduated, because the frame must have greater or less movement, according to different thicknesses of type. The stop is a plate standing vertically within the chamber, as seen at $c^4$ in Figs. 13 to 18, inclusive.

The edge is notched out to form the graduations, as in Figs. 15, 17, and 18. At the opposite end the frame $y^3$ has a prolongation from one side, with a crossed termination, and which is so situated as to close the mouth of the type-channel, and the line of type, therefore, as it is fed up by the clicks, strikes against this piece, as represented in Fig. 13. The short ends of the levers $z^3$ stand in such position that they project a little over the edge of the type as it comes up against the frame just in front of them, and as shown in Fig. 13, where $a$ represents the line of type, and it is on that side that the type is nicked, as shown in the reverse view, Fig. 15.

In combination with the levers $z^3$, which are called the "type-levers," there is a second set; but these are right-angled at both ends. They are shown at $n^4$, Figs. 11, 13, and 14, and are placed on the outside of the indicating-box. By Fig. 11 it will be seen that they are disposed in two groups, and correspond precisely with the type-levers. They have their axis at $a^1$, Figs. 13 and 14. The short right-angled ends enter the side of the box, and terminate so as to overlap the type-levers, each lever having a match type-lever, against which it presses. This pressure is applied by a set of small springs, $m^4$, acting upon the projecting tails, as shown at Figs. 13 and 14. The opposite ends of these levers, at $u^4$, also turn inward at a right angle, and are pointed. They pass through the side of the box, as shown in dotted lines. Upon the inside of the box there are two sets of bars, lying parallel thereto and close together, as at $p^4$. The upper six belong to the upper six levers $n^4$, and the lower set of seven belong to the like lower set of levers. All of them have a notch, $v^4$, Fig. 14, cut within them, which notches stand directly opposite to the points of $u^4$, and which, when engaged, are detaining-points. On the opposite side of the box is still another set of bars, the topmost one being seen at $y^4$, while the others are represented by $r^4$ in Fig. 10, which is a view, in elevation, of the interior of 13 and 14, the side $m$ being removed. These bars are spaced farther apart than the others, as shown, there being only nine of them, this number being amply sufficient to produce the requisite number of indications, while thirteen type-levers are required to correspond to the thirteen different thicknesses of type in the font. These two sets of bars, viz., $p^4$ as one, and $y^4$ and $r^4$ as the other, are connected together, so that the movements of one set will be transmitted to the other by a set of cross-levers, $q^4$, which are pivoted to the top and bottom of the box at their centers. These levers consist of plates extending the whole depth of the box, an edge view of which is given in Fig. 10, where they are seen through the bars $r^4$. The bars $p^4$ are connected to the levers by pins, which embrace or clamp them on both sides; but the opposite bars $y^4$ and $r^4$ have but one pin; therefore the levers can act but in one direction against them, being allowed in the other to go free.

There are two bars, one on each side, which act upon all the levers, viz., $y^4$ and $t^4$, Figs. 10 and 11. Thus, in Fig. 14, the bar $y^4$ will be seen to have a pin pressing against the end of each lever, toward the inside. These two bars are for the purpose of giving motion to all the others, and may be called the "prime movers," while $p^4$ and $r^4$ may be called the "indicating-bars." Bar $r^4$, Fig. 11, connected to bar $r'$ by the lever $r'''$, Figs. 11 and 13, may be called the "a" bars, as being those which set the indicator for that letter. These sets of bars $p^4$ are required to be very compact and close together; hence one necessity for transferring their movements to the indicators through the second set of bars $r^4$, which, it will be seen, are arranged open, and have more freedom.

I have stated, as an example, that movement of the bar $r^4$, Fig. 11, would move $r'$ on the opposite side.

These bars are not connected with each other throughout in this single manner. On the contrary, some form combinations—as, for instance, a movement of two bars $p^4$ may be so connected as to move every alternate one of $r^4$.

The changes, therefore, may be very great in number, and such is necessary in order to effect indications for all the letters. There is a separate lever at $w^4$, which connects the two moving bars $t^4$ and $y^4$, and in addition to this it also acts upon all of the bars $r^4$, while $t^4$ acts upon all the bars $p^4$. In Fig. 13[a] is a view of this lever detached. On the side which faces the front of the machine there is a series of feather-springs, $x^4$. The free ends of these all press upon the bars $r^4$, a spring to a bar. $t^4$ engages the lever by a pin or a depression, as shown, and $y^4$ by a like pin on the opposite side. The movement of $t^4$ turns the lever $w^4$ and moves along $y^4$, while, the springs $x^4$ pressing upon the pins on $r^4$, those will be likewise moved. Now, as the bars $t^4$ and $y^4$ move at the giving of every indication, while of $r^4$ all are not allowed to move, some being held back, these springs, by their yielding, are to permit of their being so held.

In Figs. 13 and 14[A] this is shown, where it will be seen that one of the springs $x^4$ has been held back by the non-moving of a bar. Upon each of the other levers $q^4$ there is a single feather-spring, $s^4$, the free end of which is projected so as to be on a line with the bar $t^4$. This bar has as many pins as there are levers, and these press upon the springs. Thus the movement of the bar $t^4$ would, if unopposed, move also all the levers. When, however, some are held back their springs yield, as in the former case, and as seen at $s^4$, Fig. 14[A]; and $q^4$ in that figure is a lever, allowed to be carried along by $t^4$.

The movements of the bars $r^4$ are communicated to the indicators $e^7$ by means of a set of connecting-rods. (Shown at $a^7$ of Fig. 10.) The vertical levers $z^6$, attached to the side plate $m$ of the box, which plate is omitted in Fig. 10, connect the bars $r^4$ with the rods $a^7$, as shown, and these latter are connected to as many short arms, $b^7$, Fig. 12, to which the different indicators are attached, in a manner already described.

In Fig. 10 the three upper bars have been acted upon. These have withdrawn three connecting-rods, $a^7$, and accordingly three of the lowest of the indicators have been projected through the excavated ring $m^5$, as shown.

The line of type stands in its channel with that side which has the indicating-nicks facing the front of the machine, as at $a$ in Fig. 15, which is a section through V Z of Figs. 13 and 14. As the feeding-click forces the line along, the head type pushes against the frame $y^3$, Fig. 13, driving that before it. The type now enters the box and rests upon a base, as in Fig. 11, at $a$. In this position the short ends of the set of levers $z^3$ are in front, and lap upon the type. The cam $o^5$ retreats from under the levers $n^4$, and these in turn, by means of springs $m^4$, press, by their inner ends, upon the levers $z^3$, causing them all to be driven against the edge of the type. Those levers which stand opposite to any nick sink in, thus allowing the points $u^4$ of their match levers to enter the notches $v^4$ of their appropriate bars, while all those resting against the plain edge of the type are held back. Here comes in the arrangement to regulate the feed for thickness, because no more than one type at a time must be admitted to the box, and as a very thin space may be followed by the thickest type, and vice versa, the necessity for a varying feed is obvious, as otherwise there would be at once a derangement of parts. This feeding in of type of differing thicknesses upon the base $a$ is managed by the stop $c^4$, for by the sinking in of some one of the levers $z^3$ in the top set its tail will be made to stand directly in the way of that stop, as seen in Fig. 13, and the frame $y^3$ will be arrested in its movement by said tail striking the stop.

In Figs. 17 and 18 a profile of the stop $c^4$ is given, and by the notches upon it it will be seen that the frame may move farther before some of the levers will strike than others.

Thus a nick at the top of the type will move a lever at the top. Opposite to this on the stop is a notch of a certain depth, equivalent to the thickness of some one type. The next notch may be deeper still, and would allow a further movement of the frame, and, of course, this would admit a thicker type upon the base. In the next place it will be seen how these nicks are made to affect the indicators. Some one or more levers in the lower set will sink into a nick or nicks at that part of the type. As the crooked levers $n^4$ all press upon $z^3$ when any of them move, similar ones in that set will also move. In all the sliding bars $p^4$ there are notches cut at $v^4$, so that when any of these levers move, the pointed ends $u^4$ on $n^4$ will drop into these notches. As, for instance, suppose there are six nicks in a type, six of the crooked levers will be allowed to move by reason of a movement of a like number of $z^3$ dropping into these six nicks of the type, and a like number of points $u^4$ will drop into the notches $v^4$ of as many different bars. Now, when the driving-bar $t^4$ moves, six of the bars $p^4$ will be detained. Consequently only as many levers can move as are required for making the proper combination for indicating the letter; and in Fig. 10 it will be seen that six of the bars $r^4$ have been held back, while the others are allowed to move, (the bar $y^4$, as already stating, moving at every indication,) and thus the indicators in the excavated ring are set. These movements of the bar are caused by a power derived from a set of cams and pins placed upon a vertical shaft, $j^4$, which has a vibratory or rock-shaft motion. This motion is regularly given in a proper manner, and in time, by a cam upon one of the cross-shafts beneath the bed, as seen at $p^2$ in Fig. 4. This cam actuates a lever, $r^0$, Figs. 4 and 10, and $w^0$ is a stop brought into play by moving $v^0$, Fig. 1. It catches the tail of the lever, and prevents it from vibrating when engaged. The first cam is at the top upon a wheel, as at $e^4$, Figs. 10, 13, and 14. This moves a piece (shown in $a^5$, Figs. 11 and 16,) the end of which stands directly over a type when in the box, and that end is allowed to come down upon the type by the force of a spring, $d^5$, as the former is fed in. The object of this is to insure that the type shall stand solidly upon the base, for that forms a gage whereby all the nicks are sure to stand opposite to their proper levers. Before the type is discharged the cam-piece $e^5$ comes under an arm on the cross-piece, by which $a^5$ is hinged, and raises it, as shown.

At $z^4$ is a pin, which strikes against the bar $y^4$, and, by driving that bar, returns all the levers and bars of both sets and on both sides to their starting position, as seen in Fig. 14, where all the pins are in action. On the side of the wheel opposite to this pin is a segment working into a rack-bar, $k^4$. This is the discharge for thrusting the type into the gripers of the conveyers. In Fig. 13 it is seen withdrawn, and in Fig. 14 pushed forward, having discharged a type. The end of this is forked, as in $k^4$, Figs. 17 and 18, and strikes the type in three places, so as to push it off squarely upon the conveyer. Lower down on $j^4$, at $j^{4\prime}$, Fig. 10, is another wheel, and on the side of this, as in dotted lines, Fig. 11, (also seen in Fig. 14A,) is a pin, which strikes against the driving-bar $t^4$, and is the power to drive all the levers and bars when setting the indicators, as the pin $z^4$, operating on bar $y^4$, serves to return them after such action. Upon $j^6$ is another cam, not seen, as it is on the opposite side, but which vibrates a piece which lifts all the points $u^4$ out of the notches $v^4$. That piece is a post standing vertically, upon which are two toes, one, $o^5$, Figs. 11 and 14, being at the top, and the other, $o^4$, at the bottom. $o^5$ stands between the levers $n^4$ and the outside of the box, while the end of the toe $o^4$, extending into the box, is acted upon by the cam on $j^6$. In Fig. 14, $o^5$ is in action, having lifted the toes $u^4$ out of the notches $v^4$.

In Fig. 13 the cam $o^5$ has retreated, thus allowing the levers $n^4$ and their toes $u^4$ to act. There are certain pieces which must always return with accuracy to a given position, and of these the frame $y^3$ is one, for the least play here might falsify the setting. There is provided, however, both for freedom and accuracy, to this, as follows: For accuracy, the inner side is made always to face and keep in contact with the inner end plate of the box, effected by a spring brought into action to press it up just before a feed of type takes place; and for freedom, the pressure is taken off at the time the frame returns. The spring is shown at $f^4$, Figs. 13 and 14. It does not press directly upon the frame, but acts upon a small bell-crank, $e^4$, (seen in dotted lines,) one end of which comes through a hole in the division-plate, and presses upon $y^3$. The end of the crank through this hole is seen at $e^4$, Fig. 17. The other end or tail is for lifting the crank off, and is acted upon by a pin, $l^4$, beneath the top wheel of $j^4$.

In Fig. 13 this piece is shown in action, pressing upon the side of $y^3$. In that position the type is just being fed in, and then it is most necessary that these parts have an accurate adjustment. When the type has been discharged the frame immediately returns, and is driven back by a spring, $d^4$, Figs. 15, 17, and 18, previous to which action the friction produced by the pressure of $e^4$ is taken off, as seen in Fig. 14, thus allowing the frame and its set of levers to be carried back easily. There is one type which has no indicating-nick upon it, and is not to be deposited within the regular cases, as it belongs to the cup N, Fig. 1. This is the "thin space," and it is always set in the line when wanted by the hand of the compositor. When this presents itself to be distributed the indicating-levers do not act, and it requires, therefore, a special stop to check the feed at the right distance. This stop is a small lever, $g^4$, hinged to the frame at $h^4$. A side view of it is that of a plate, and it is as deep as the whole set of indicating-levers, as seen at $g^4$, Figs. 15 and 15½. When, therefore, these latter do not act, (which is when the aforesaid type without nick approaches,) the stop $g^4$ will come into play, as exhibited in Fig. 14; but when these levers act, this is pushed to one side, escaping the stop altogether, as in Fig. 13, wherein $g^4$ is shown in dotted line, the pin $l^4$ acting upon it to put it into position by the intervention of the secondary piece $i^4$, as shown. As this secondary piece imparts the movement to bring this special stop into action, there must be at every feed of type a provision to relieve the graduated stop $c^4$ itself, because when not in action, as before remarked, the end of $g^4$ will lie at the side of the stop $c^4$, so that when the pin $l^4$ comes into play the force would be received upon the stop and break it, were it not able to yield. $c^4$ has, therefore, some lateral play allowed it, and reacts against a spring. (Shown at $c^{4\prime}$ in Figs. 13 and 16, and in 13 and 14.) The piece $g^4$ also moves back the levers $z^3$ to the position shown in Fig. 14, after the discharge of each type.

*3d Division.*—The third head of the composing or type-setting mechanism will now be described. The figures used will be 1, 2, 3, 4, 5, 6, 25, 26, 33, 34, and 35. The front left-hand half of the table, Fig. 1, is devoted to the parts operated by the compositor, and is also the place where the type is received and formed into column. At the back of this table is the receiving-channel, where the type is delivered by the setting-conveyers, and forms a long line, as at *f*. The channel terminates at the top of the galley M, upon which a column of type is represented in process of formation. This galley has one fixed side, and one movable, $z^0$, which may be set to different distances from the other for different widths of columns. At $e^{10}$ is a follower, for pushing down the column after a line has been received. This is operated by a handle, $b^{10}$, Figs. 1, 5, and 6, by which a short vibration is given to it. At $f^{10}$, same figures, is a gage for measuring the length of line necessary to go across the page.

This is a wedge, fixed by an upright to a bar, $g^{10}$, along which it can slide and be set by a screw, and this wedge can be pushed back out of the way of the line of type. The compositor divides the line $f$ with a thin metal plate, and pushes it along until it strikes the end of $e^{10}$, which closes the end of the channel after it has pushed down the column, and then the distance from that end to the gage $f^{10}$ is the same as the width of the column. He now pushes $e^{10}$ back, and carries on the type (separated by bringing the wedge of $f^{10}$ into line) until it strikes against $z^0$, and the column is then pushed down that distance by $e^{10}$, as before.

At L is the table of indicating-keys, a sectional view of which is given in Fig. 3. These connect, by means of a system of levers and trackers, with the indicating mechanism in the center and beneath the carrying-wheel.

In the description of the distributing mechanism, it was shown that all the movements for effecting the set of indicators were accomplished through the movement of the nine rods $r^4$ of Fig. 10.

In the composing mechanism there is a like number of indicators, for effecting the set of the points upon the conveyers, and these are acted upon by nine levers, which connect the keys with the nine indicators; but as there is a much greater number of keys than of indicators, of course these latter act to form combinations of movements, and these, calculated by the rule for permutation upon nine places of figures, would be ample for the most extensive alphabets or characters of any known language. The keys, as shown, are pins with buttons on top, for the convenience of fingering.

The pins pass through holes in the table, which holes are arranged in a regular order, so as to form parallel rows, as shown in Fig. 1, each pin acting upon a small cranked lever $a^9$, Fig. 3. Beneath these lines is a series of sliding bars, $b^9$, a bar to each lever and key. These, in consequence of their number and the space they occupy, must be very thin, and are most conveniently made of strips of steel. They are arranged in a rack formed by the plates $b^{10}$, as in Fig. $4^A$. Upon the top of each bar there is a single projecting pin, against which the cranked levers $a^9$ strike, these pins being in a different situation, according to the position of the cranks and keys. Upon the under side there are also projecting pins; but instead of being limited to one to each bar, they are not only of various numbers, but also in varying positions, as illustrated in Fig. $4^B$, where two bars are seen detached. The upper side shows the single pin $a$ $a$ with which each is provided; but on the under side one has two pins, $i$ $i$, stationed far apart, while the other has three, $o$ $o$ $o$, in succession. One of these bars has nine in succession, and this corresponds with the nine indicators in the excavated ring, which have already been described at $c^7$ of Fig. 12.

Thus, when the key which acts upon this slide is pressed down, all the indicators would be set also; if the key which acts upon the slide $i$ $i$, Fig. $4^B$, only two indicators would be moved, viz., the top and bottom ones; while with the next slide, three consecutive levers would be moved, as also seen in action at $c^9$, Fig. 3.

There are nine levers $d^9$, shaped as shown in Fig. $3^A$. They have a fulcrum or axis, the top half of the lever being a blade, while the lower half is simply an arm placed near one extremity of the axis; but as each of these arms connects with one end of one of the trackers $e^9$, which lead off to the center of the machine at right angles, the arms cannot be placed equally near the end, as otherwise the trackers could not be engaged. These latter lie beneath the bed of the machine, and their position is seen in the plan view of said bed in Fig. 4, wherein the ends of the levers $d^9$ will be seen engaged, and which will sufficiently explain their arrangement upon the axes, as above referred to.

It will be seen that the whole row of slides $b^9$ lies across the tops of the levers $d^9$, and at right angles to them. Thus any slide can be made to act upon as many levers as may be required for effecting movements in the indicators, according to the position of the pins $i$ $i$ or $o$ $o$. Of the one hundred and nineteen keys represented in the drawings, each one corresponds to a type of a different name or character.

Thus, the indications must be obtained by variously combined movements of the nine levers $d^9$. The trackers terminate at their other ends in a second set of levers, (seen at $f^9$, Figs. 2, 25, and 26,) and shaped as in the detached view, Fig. $26^A$. Embracing their lower half is a swing-frame, $n^5$, Fig. 26, the bottom of which is constantly kept pressing against the lower ends of the levers $f^9$. This frame pulls the levers back after having been acted upon by the trackers. The tops of $f^9$ are beveled, as shown, for the purpose of transmitting motion to a third set of levers, $g^9$, which stand at right angles thereto, one of the ends resting at the bottom of the beveled top of each lever, as in Fig. $26^A$. Thus, by pulling $e^9$, as shown in said figure, $g^9$ will be raised by sliding along the inclined top.

The levers $g^9$ form the connecting-links for carrying on the motion of the keys to the register-levers. (Seen at $h^9$.)

It has been stated that the compositor could compose ahead of the operation of the machine—*i. e.*, that without regard to the speed of the carrying-wheel, or the delivery of type by the conveyers, he could indicate letters to be delivered to the compositor's table considerably in advance, so that he could be able to stop working and yet have the letters so indicated delivered without any further attention on his part. The parts whereby this is accomplished will now be described.

The movement of the keys does not directly effect the set of the indicators, but operates instead upon what is called a "register-wheel," so contrived that a considerable number of signs or letters can be, as it were, recorded upon it. The revolution of the register-wheel brings these successively to act upon the indicators in time to effect the set of the indicating-points upon the next approaching conveyer. The register-wheel is composed of two broad rings, one of less diameter than the other, but both of the same breadth. The smaller is placed within, thus having an annular space between. The outer ring is represented at $x^9$. Through both rings is made a series of small holes, each hole in the one being directly opposite to a hole in the other. Nine holes are drilled in a vertical line, and at equal distances apart. A short space from these nine more are drilled in a vertical line, and thus continued until the whole circumference is filled, care being taken that each hole in every vertical line is also on the same horizontal line with its neighbor. The holes are then to be fitted with pins long enough to project beyond the face of the rings, and, to keep them from falling out, they are enlarged in the middle. These pins are seen at $o^9$ in the several figures; and by these is also shown the order in which the holes were drilled.

Every vertical row of nine pins represents the nine indicators, and it is by these that those indicators are acted upon. Thus, if there were one hundred such vertical rows upon the circumference of the ring, there could be a like number of indications effected by one revolution of the same; and it is by pushing these pins out that the indicators can become acted upon by them.

At $o^{9\ell}$ three pins are shown pushed out at the bottom of a vertical row, while all those on the opposite side are pushed in, and consequently out of action.

The register-wheel is supported upon the fixed axis $k^9$, and turns upon it. The motion is intermittent—*i. e.*, moves along, by means of the action of pawls, notch by notch, the cogs for which are seen in the top views, and the action of the driving-pawl at $w^9$ of Fig. 1. Each movement, however, is of the precise distance between the rows of pins in a vertical line. The pressing down of another key would act immediately to push out certain pins in the next vertical line, and in this way nearly all the pins might be set, ready to indicate letters on the indicators, and such setting of the types would take place in due time as the register revolves. This is said of nearly all the pins, because, in fact, a portion of the interior space is taken up by fixed mechanism, and consequently the circumscribing register-levers would be interrupted at that part.

These register-levers have a peculiar action, and this consists in their sweeping round the interior of the ring, and having also a vibratory motion. This vibratory motion is imparted at the center, where one end of each lever remains while the other ends sweep around. It is the outer ends that act upon the pins. These levers are seen at $h^9$, hung in a frame, $j^9$, which projects horizontally from the center shaft $k^9$, to which it is attached by two eyes in the ends of the top and bottom pieces, as seen in Fig. 26, the frame turning about the said shaft as its axis. The nine levers $h^9$ are sustained in a vertical line by the fulcrum-pins $i^9$. The inner end of each lever terminates in a flattened ring, through all of which the shaft passes freely, so that they are not touched by it. The outer ends of these levers terminate just short of the surface of the inner ring $x^9$, and when acted upon by the keys they lie in such position that their ends can pass between horizontal rows of the pins, the top lever standing below the top pin, and the lower beneath the lowest pin. These levers are composed of thin plates of metal, but having considerable breadth, being nearly the same as that of the rails $j^9$, as in the top view, Fig. 25. The outer ends of the levers are furthermore beveled in one direction, as in $l^9$, same figure.

Attached to the frame $j^9$ is a pulley, $t^9$, to which a cord, $r^9$, is affixed, having a weight at its free end, as shown in Fig. 2. The force of this weight is directed to pull the frame and its levers around the interior ring in the direction of the arrow $y^9$, Fig. 25. The travel of the frame is governed by an escapement, which allows it to move only a certain distance at a time, and this distance must be only the interval between one vertical row of pins and the next.

Figure 25:
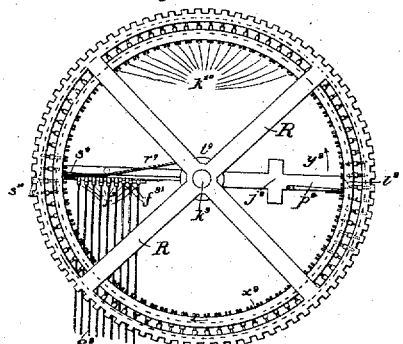
Figure 26:
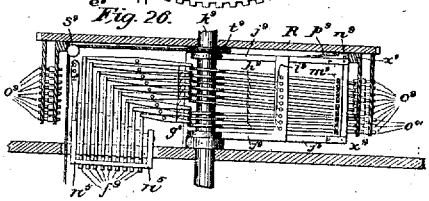

At the inside top of the ring $x^9$ is a series of two rows of pins, set in the manner of the pin-wheel escapement of a clock, as in Fig. 25$^A$. The piece acting as a pallet is the end $n^9$ of a vertical bar, $m^9$, fixed near the end of the frame $j^9$. This point $n^9$, rising and falling, escapes from one pin to the next, allowing the weight to pull the frame accordingly. Through the bar is a series of slotted holes, one to each of the levers $h^9$, to all of which it is connected by pins projecting from each lever H through the hole opposite, as in Fig. 26, so that the movement of any lever will raise the escapement-bar, and thus allow the whole frame to move. To bring it down again there is a spring, $p^9$, as shown. At $g^9$ is a series of coupling-levers, one to each register-lever. The inner ends of these rest upon the rings of the inner ends of the former, while the other ends stand against the set of levers $f^9$, in the position Fig. 26$^A$, the whole arrangement being shown in Fig. 26. Thus it will be seen that, no matter in whatever portion of the circle the setting-levers may be as respects their outer ends, the couplers $g^9$ will always be able to act upon them by reason of still pressing upon some part of these rings.

The manner of transmitting the movement upon the keys to the register-levers and their action upon the register-pins can now be seen. In Fig. 3, key $a^9$ is represented as pressed down. This moves along the slide $b^9$, upon which there are three engaging-points, and accordingly three of the levers $e^9$ were acted upon. These pull three trackers, the motion of which is transmitted to the three lower register-levers $h^9$ by the opposite ends of $g^9$ sliding up the beveled ends of those three levers $f^9$, pulled by the trackers, as seen in Fig. 26. The outer ends of the register-levers are by this movement brought so as to interfere with the inner ends of the register-pins, and, the bar $m^9$ being raised at the same moment, the escapement acts, and the frame is allowed to move along. The beveled ends $l^9$ of the three raised levers will strike three pins in the next vertical row, opposite to which it is now brought up by the escapement, and three pins are pushed out, as at $o^{9\prime}$, Fig. 26. Taking the finger off the key allows the register-levers to fall back to place. The escapement-bar drops down and is caught by the lowest of the escapement-pins $k^{10}$. A second movement of the swinging frame then takes place, moving the ends of the register-levers so as to stand half-way between two vertical rows of pins; for it will be evident that if this were not done the vertical movement of the levers $h^9$ would be interfered with by said pins. Any other key being pressed down, another set of the levers will take place, according to any particular combination required to give the indications of the next letter required in the composition, and the proper pins will be pushed out in like manner in the next vertical row. In this way the register-levers will sweep round the whole interior until they arrive at the division-plate $s^9$, upon which the levers $f^9$ and $g^9$ are affixed. At this place a warning will be given by a stroke upon a bell, (seen at $a^0$ in Fig. 1.) The register-wheel will thus contain a record of as many letters to be indicated as there are pins pushed out in the vertical rows, the compositor stopping on hearing the signal, and these letters will all be delivered in regular order in the channel before the compositor, without further attention on his part.

It now remains to describe, in connection with this part, the mechanism for and the manner in which the pins act upon the indicators and effect their setting.

The position of the register is seen in Fig. 1. It is suspended upon the same axis with the carrier-wheel, and is beneath it. The register has, moreover, rotary motion in the same direction as the carrier, and it is moved by said carrier at the proper time and to the right distance for giving the set to the indicators.

At $v^9$ is a cranked lever, affixed upon the top of a post rising from the bed-plate, and having a cam, $w^9$, on one end, and a pawl, $u^9$, at the other. This pawl works into the ratchet upon the rim of the register, and by the vibrations of the lever gives to the register its progressive motion.

On the arms of the carrier J there is a series of pins projecting below the surface, each of which is designated in Fig. 1 by a circle at $w^6$. As these pass along they strike the cam $w^9$, thus moving the lever $v^9$, and causing the pawl to retreat and take a hold in a ratchet-tooth. So soon as the pin has passed by, the lever returns by the force of a spring, and thus pushes the register along the distance of one notch, and in the same direction that the carrier-wheel itself is moving.

At $m^0$, Fig. 1, is a series of parallel rods, being nine in number, corresponding with the number of indicators, and also with the number of pins in a vertical row. On each end of a rod is an arm. The outer ones of those at $k^0$ are straight; but the ends of the inner ones are inclined or bent, as at $n^0$, Fig. 2[A]. These arms stand horizontally, and the inner set of arms terminates near the face of the register, and so that each setting-pin, as it passes along, will go between two arms, as in the last-named figure. If a vertical row passes by in which no pins project, no action will take place upon the arms; but where any project, those will strike the bent ends of such arms as they pass between, thereby raising them. The outer arms $k^0$ are, by this means, brought to act upon the indicators in the following manner: These indicators are beveled wedge-shaped pieces, placed in a vertical row in the excavated ring, and are of the same form as those already described at $e^7$ of Fig. 12; but instead of being attached to arms $d^7$, as in that figure, are secured to lengthened rods or bars, seen at $f^0$, Fig. 1. These bars are supported in a framework, so that they can play back and forth to and from the excavated ring. Each one has a notch at $l^0$, and attached to each is also a feather-spring, $g^0$, the force of which is directed to push the indicator outward in the direction of the arrow. All these rods are held back by a lever, $i^0$, standing upon the bed-plate of the machine, and one end of that lever is a broad flat plate, against which all these bars press by a shoulder, cut out as shown. At $j^0$ is a spring, pressing upon the lever against the force of the nine springs $g^0$, and is sufficiently powerful to overcome them all. At $h^0$ is a cam, raised upon the other arm of the lever $i^0$, and this cam is struck by the pins $w^6$ as they pass along. When so struck the lever is moved, and immediately the indicators also move forward by the force of these several springs, causing them to follow the lever. To effect, therefore, the set of the indicators, it is necessary to hold those back which are not required to enter into the combination. This is accomplished by the arms $k^0$, and which, when not in action, stand in the spaces between the parallel bars $f^0$; but whenever any of the setting-pins in the register have, by passing along, raised any of the opposite arms $n^0$, such as are so raised lift, also, their opposite arms $k^0$ into the notches $l^0$, immediately after which a pin, $w^6$, passes along and strikes $h^0$, thus moving the lever. All the indicators $f^0$ will now begin to move; but those having arms $k^0$ in their notches $l^0$ will be held back. Thus, in Fig. 26, three pins, $o^{9\prime}$, were pushed out. These will remain in that position until, as the register is fed along, they would be brought to pass between some of the arms $n^0$; and as these pins are the lowest ones, the three lowest arms would be raised, and hence three of the lowest indicators held back, while all above would be allowed to move forward, thereby projecting six indicators beyond the outer face of the excavated ring. These indicators, it will be seen, are placed just at the entrance to the series of type-channels, so that the indicating-points upon the conveyers belonging to the composing part receive their set before they reach their types. The whole of this part of the mechanism is so timed as to bring the indicators into action just before a conveyer approaches, and to retreat and remain out of the way until the distributing-conveyer, which follows, has passed by. The indicating-points on a setting-conveyer pass by the indicators, and receive their action while the pin $w^6$ is on the cam $h^0$. The moment this gets clear, the levers draw back all the indicating-bars $f^0$. The next row of setting-pins now approaches, and another set is given, and so on continually so long as there are any to act. As soon as the setting-pins have acted they must be pushed in again. This is accomplished by a beveled plate, $s^{10}$, Fig. 25, standing close to the face of the register, whereby, as the wheel passes, all projecting pins are pushed in. It must not be understood that the compositor is obliged to continue to operate the register-levers until he has worked them round to the alarm-bell; on the contrary, he composes fast or slow, and may work quite irregularly, stopping at frequent intervals to set his lines into column, to space, and to justify, as may be required. Thus, while composing, he is working the register-levers and frame $j^9$ along in a direction contrary to the motions of the register; but if he works no faster than the register moves, the levers and frame will remain in about one place; if faster, he will work the frame round to the alarm, and then he must stop. Whenever he stops, the levers and frame are carried along with the register-wheel, because they are both connected by the escapement. Thus, if allowed to go on, it would be brought into contact with the framework and levers, which form a division, as before remarked. Just before arriving at this place the lower bar of the frame $j^9$ strikes a toe, $c^0$, Fig. 1, and by that means engages a stop-pawl, $d^0$, and thus, holding the register in check, the operation of setting ceases. The setting-conveyers will merely pass round empty; but the distributing will, if there be type on the galley, go on independently.

The operation is as follows: The main shaft S is to be set in motion by some suitable power, whereby it will be maintained in revolution with the proper, and, as near as may be, at unvarying, speed. This puts the great type-carrying wheel J also in motion, with all the various parts therewith connected and operated, as has already been described. If a column of dead-matter has been placed upon the distributing-table W, properly set up and blocked, distribution will commence by setting the two stops $z^2$ and $v^0$ so as to release the levers $u^2$ and $r^0$ of Fig. 4, whereby those levers will follow the course of their two actuating-cams $w^2$ and $p^2$. By means of the first the pawl-lever $s^2$ will begin to feed up the line of type, if that has been raised into the channel $a$; if not, no action will take place until such has been done by the operation of the tilting-frames $x$ and $o^3$, as already described under Figs. 5, 6, 8, and 9.

All the parts are so timed that the moment the first type presents itself at the indicating-box the ends of the levers $z^3$ will be in position to act upon it by the frame $y^3$ having moved just previously up to the mouth of the type-channel. At this moment the end of the arm $u^2$ of Fig. 4 has ascended the inclined side of its cam and rests upon the level surface of $w^2$, and the cam $p^2$ comes into action, moving $r^0$, which turns the cam-shaft $j^4$, as seen in Fig. 10. The cam on $j^6$ now leaves the toe $o^4$, Fig. 11, whereby the upper toe $o^5$ retreats, thus allowing all the levers $n^4$ to act, which action, as already stated, presses the ends of the indicating-levers $z^3$ upon the edge of the type, and then such levers as are opposite to nicks sink in. The cam-shaft $j^4$, moving at this time as shown by the arrow in Fig. 14, continues on until the indicators $e^7$ have been set in the excavated ring according to the nicks upon the type, and in the manner already described.

At the conclusion of these motions the lever $r^0$ has ridden out of its cam and rests upon the level part of the cam-wheel without further motion, and the other cam on $w^2$ has passed round the shaft, so that a feed now takes place, the pawl driving along the line of type, and this in turn pushing the frame $y^3$ until it is arrested by the tail of the lever, which is set for thickness, striking against the stop $c^4$, at which time the type is in position upon the base and just at the opening for its discharge.

The feed, as has already been mentioned, is performed by the force of a spring, $x^2$, Fig. 5, the whole force of which is still acting; but before the type is discharged the line is relieved from this by the opposite curve of the cam acting upon the lever $u^2$, and it rides upon the level surface of the edge of the cam-wheel. The motion of $j^4$ is now reversed, and it is turned in the direction shown in Fig. 13.

The former motion of $j^4$ was caused by the riding of the lever $r^0$, Fig. 4, out of the cavity of the cam. The present motion is by that lever descending into said cavity, the edge of which arrives just as $w^2$ has ceased to act.

The forked ends of the discharging-pusher $k^4$ now approach the type, striking it at three places, and push it off the platform upon which it stood onto a distributing-conveyer, which has just previously been caught by the detaining-hook $x$ $x$, Figs. 13 and 14.

While the discharge is in action several other parts are being restored to their position as at starting, viz: The pin $l^4$ has struck the bell-crank $e^4$, as in Fig. 13, thus taking the pressure off the frame $y^3$. It has also acted upon the lever $i^4$, whereby all the indicating-levers are brought into line in readiness to act by the means already described.

The toe $o^5$ has acted to carry the levers $u^4$ clear of $v^4$, the indicating-bars being returned by the pin $z^4$ striking $y^4$. The moment the type is clear of the stop on the end of the frame $y^3$ the spring $d^4$ is allowed to act to drive it back, bringing up across the mouth of the channel and against the next type, and in which position the ends of the levers will all overlap the edge of the next type, as shown in Fig. 14.

The distance at which the ends may overlap is only the amount which they project beyond the face of the stop upon the frame $y^3$, and this distance is no greater than the thickness of the thinnest type which has indicating-nicks upon it. The lever $r^0$ now begins to ride out of its cam, and thus the motions are again reversed of $j^4$. The discharge $k^4$ is withdrawn, $o^5$ retreats, and, the levers $z^3$ pressing upon the type, the indications are performed as before. The next is as to the proper arrival of a conveyer to receive the types at the moment the discharging-pusher comes into action.

In Fig. 4 it will be seen that the shafts S and T are geared together by equal wheels $o$ and $n$. They therefore revolve alike. As the shaft S propels the type-carrying wheel, the movement of the latter must be so timed as to bring a distributing-conveyer into position a little before each action of the discharge, and which action, by the drawings, is shown to be once for each revolution of T.

On the carrying-wheel ten distributing-conveyers are shown. The revolutions of said wheel are, therefore, as one to ten of T. The starting-points of the conveyers being at equal distances apart, and the wheel set so as to bring that point opposite to the detaining-hook at the discharge-opening, the conveyer is always caught in time to receive the type.

The position of the indicators $e^7$ is such as to effect the set of the indicating-points on the conveyer as it approaches the discharge-opening and before it is caught by the detaining-hook. After a type is received, the conveyer is released by its tilting spring throwing its griper end inward, and it then moves on with the carrier-wheel, but at the back end of its traveling slot $g^5$. It is, however, made almost immediately to overtake its first position by the movement of the second pawl $p^6$ of Fig. 1, as already described. It thus carries its type, firmly held by the gripers, until it has arrived at the mouth of its proper type-channel, at which place there is an excavation or set of excavations in the grooves of the ring $m^5$, corresponding to the set given to the indicating-points at starting, and which represent the letter carried. The conveyer is accordingly permitted to tilt the griper end toward the cases, where it is caught by the detaining-hook $x$ $x$, and held there until the type is discharged into the case by the pusher, as already set forth.

The operation of the composing mechanism is as follows: The compositor stands in front of the table of keys L, Fig. 1, the galley M being at his left hand, and his copy before him in a convenient position for reading. The width of the intended column or page is fixed by the gage-plate $z^0$, and the length of each line to correspond by the gage $f^{10}$. He now commences registering the letters by operating upon the keys. This he may do without any regard to regularity or speed. If he presses down the keys faster than the carrier-wheel delivers the type he records signs upon the register-wheel ahead of their delivery, as already described, and the speed of the carrier-wheel is such that he is able to do this. In continuous working the revolving frame, having the register-levers $h^9$, may be worked round, so as to stand about midway between its two extreme points of motion, as it will be remembered that it cannot complete a whole revolution about the register-ring. When in this position enough letters will have been recorded to allow of time to stop and justify the lines by the insertion of the thin spaces, and make other corrections, as may be needed. The type will now begin to arrive at the setting-channel at $e$, and be regularly deposited therein in the proper order and position.

In Fig. 1 a portion of a column is represented with its top line just fed in by the comdositor. He now pulls the handle $b^{10}$ toward him. This moves the follower $e^{10}$, and causes the whole column to be pushed down by the distance of that line. The follower will then stop the end of the channel. The gage $f^{10}$, which is a sharp-edged blade affixed to a vibrating post, is now to be pushed back. Being out of the way, the compositor may push up the line of type in the channel until it strikes against the end of $e^{10}$, and then $f^{10}$ is to be brought forward. The sharp edge of the gage passing between the types separates off a line of the right length for the width of the column. Here is the time to space the letters or words, because it may happen th the gage may strike against a type instead of meeting it at the point dividing two types, which it must accurately do, in order to make correct width of column. Thin spaces are for this purpose inserted, being taken out of the cup N by hand as wanted. This done, the gage $f^{10}$ cuts off the line at the right length, and it may then be sent in upon the galley. For this purpose the follower $e^{10}$ is moved back, so as to be flush with the face of $f$, the opening formed in this way being a channel. The compositor, with a thin plate of metal in his hand, drives the line into place, and the column is forced down as before.

The thick spaces or quadrats are introduced in like manner, for filling out a line when a paragraph terminates short of the width of a column, or wherever such spaces are required.

The Italic type, numbers, and algebraical signs are or may be introduced into the cases, for it is evident that any type-channel may be devoted to type of any character by giving such type or character an appropriate set of nicks and indices in the excavated ring at such channel, as already set forth.

The machine may be devoted wholly either to setting or distributing, as the type-cases are set upon beds in sections, and may be removed for different ones to be introduced without interfering with any portion of the operating mechanism.

When any machine is devoted, therefore, exclusively to either branch, it may be arranged to perform an increased amount of work.

There are various changes which may be made, both in the arrangement of parts and in the special combinations of mechanism here described, without changing at all the general character of the machine, as, for instance, the excavated or indicating ring is described as having slotted excavations passing through and through. This is not absolutely necessary, as it is only essential to have them deep enough to allow of the sinking in of the indicating-points upon the conveyers far enough to allow those to tilt to the required distance to be engaged by the detaining-hooks $x$ $x$.

What is claimed as new, and desired to be secured by Letters Patent, is—

1. The method, substantially as described, for conveying the type to and from the type-cases, and the composing and setting tables, consisting of a type-carrier, in combination with a series of conveyers, which are capable of receiving any type indiscriminately, and also of receiving an indication representing the type so received or that required, whereby that type may be deposited into or taken from the type-cases, substantially as set forth.

2. The herein-described or any equivalent method of attaching the conveyers to the carrier-wheel, by which they are permitted to stop while delivering or receiving type without arresting the motion of said carrier, substantially as set forth.

3. Giving to the griping end of the conveyer a motion from and toward the center of the carrier-wheel, whereby said griping end is made to closely approach the place at which the conveyer is to receive or deposit a type, for the purposes and in the manner substantially as described.

4. The cam $u^5$ and lever $t^5$, whereby the griping-bolt $o$ is withdrawn and made to release the type, substantially as described.

5. The latch $v^5$ and notch $x^5$ in the bolt $o$, to retain said bolt open, substantially as set forth.

6. The pin $y^6$ on the carrying-wheel, to throw back the latch and release the bolt $o$, substantially as described.

7. The cam $d^6$ on the carrier-wheel, in combination with the pusher $b^6$ on the conveyer, to discharge the type from the gripers, substantially as set forth.

8. The lever $w^6$, secured to a stationary fulcrum, to give motion to the pusher $z^5$ of the setting-conveyers, substantially as set forth.

9. The springs $l^5$, having the double function of thrusting the conveyers out and forcing them in, substantially as described.

10. The projecting piece $g^6$ on the conveyers and the stationary hooks $x$ $x$, for the purpose of arresting the conveyers at proper places, substantially as set forth.

11. The adjustable indicator-points $o^5$ on the conveyers, substantially as and for the purpose described.

12. The bar $n^6$, cams $j^6$, and spring $o^6$, for carrying the conveyers to the forward ends of their slots, substantially as set forth.

13. In combination with the devices or mechanism for receiving the types into and for delivering them from the type-cases, arranging the types edgewise in said cases, whereby for all the types of a font a uniform throw or action may be given to said mechanism.

14. In combination with the type channels or cases, the mechanism for pushing out the type, consisting of the rack, pendulum-lever, and propelling-rod, and the pusher upon the conveyers or any equivalent thereof, as described.

15. In combination with the type-channels, the mechanism for preventing the stopping of a setting-conveyer at a type-channel when it is empty, or a distributing-conveyer at a channel when full of type, consisting of the tilting-bar $s^7$, the pendulum-lever, and rack or equivalents, as described.

16. The rim $r^7$, to lift the pawl $m^7$ clear of the ratchet $l$ substantially as set forth.

17. The excavated ring $m^5$, in combination with the conveyers and type-channels, substantially as and for the purpose described.

18. The stationary inclined pieces $g^7$, in combination with the grooves of the ring $m^5$, for restoring the indicating-points upon the conveyer to a zero or starting point, as set forth.

19. The movable indicators $e^7$, in combination with the grooves in the ring $m^5$ and with the shifting-bars of the distributing mechanism, substantially as described.

20. The channel of excess Q, in addition to the regular type-cases K, and in combination with the conveyers $d$, substantially as and for the purpose set forth.

21. The latch $j^8$ and pusher $b^8$, in combination with the channel Q, substantially as and for the purpose described.

22. The mechanism for feeding up the line of type, consisting of the cam $w^2$, spring $x^2$, arm $u^2$, and pawl $q^2$, substantially as set forth.

23. The mechanism for feeding up the column of type and for elevating the successive lines thereof into the channel, substantially as described.

24. The method of engaging and disengaging the feeding-pawls, consisting of the hanging lever $a^3$, in combination with the frame $x$, with the means for depressing the bolt $d^3$, and with the ratchet having the engaging and disengaging wedges, as described.

25. The movable plate $d^2$ in the channel $a$, to allow of raising the top line free of obstruction, substantially as set forth.

26. The arrangement of type-levers to act on the nicked edges of the type and produce the required set in the machine, substantially as and for the purpose described.

27. The combination of the type-levers $z^3$ with the distributing-conveyers, substantially as and for the purpose set forth.

28. The movable frame $y^3$, carrying the type-levers $z^3$, in combination with the graduated stop $c^4$, substantially as and for the purpose described.

29. The lever $i^4$ and apron $g^4$, to regulate the throw of the frame $y^3$ for the thin space, substantially as set forth.

30. The hammer $a^5$, to keep the type down on the bottom of the channel $a$ and insure a correct operation of the levers $z^3$, substantially as described.

31. The bell-crank lever $e^4$ and pin $l^4$, for relieving the frame $y^3$, substantially as described.

32. The arrangement of mechanism for transmitting the movements produced upon the levers $z^3$ by the nicks in the type, and for effecting the proper combinations upon the indicators $e^7$, consisting of the detaining-levers $n^4$, the bars $p^4$, bar $t^4$, bars $r^4$, bar $y^4$, and the connecting-levers $g^4$, together with the operating-cams upon the shaft $j^4$, or any equivalent combination whereby the same results will be produced, as described.

33. In combination with the keys, the arrangement of mechanism whereby the separate different signals represented by each of a geat number of keys may be produced by a less number of indicators, as described.

34. The independent registering apparatus, constructed as described, or its equivalent apparatus, which will effect the recording of the letters or signs, as indicated by the keys, independently of the type-carrying apparatus, substantially as set forth.

35. The pins $o^9$, placed in the rings R of the register-wheel, substantially as and for the purpose described.

36. The stationary cam $s^{10}$, for returning the pins $o^9$, substantially as set forth.

37. The radiating revolving levers $h^9$, in combination with the register-wheel and with the keys, substantially as described.

38. The mechanism for transmitting the indications from the register, consisting of the detaining-levers $k^9$, in combination with the setting-indicators and with the register, substantially as described.

39. The springs $g^0$ $j^0$ and levers $i^0$, in combination with the indicator-bars $f^0$ and with the register and carrier wheel, whereby the indicator-bars are caused to act on the setting-conveyers, and immediately thereafter made to retreat previous to the passage of a distributing-conveyer, substantially as set forth.

40. The toe $c^0$, in combination with the radiating revolving frame $j^9$, stop-pawl $d^0$, and register-wheel R, substantially as and for the purpose described.

C. F. LIVERMORE,
*President Alden Type Setting and Distributing M. Co.*

Witnesses:
GUSTAV BERG,
W. HAUFF.